(12) United States Patent
Rottinghaus

(10) Patent No.: US 7,930,870 B2
(45) Date of Patent: Apr. 26, 2011

(54) STALK ROLL AND STRIPPER ARRANGEMENT FOR CORN HEAD

(75) Inventor: Robert Rottinghaus, Jesup, IA (US)

(73) Assignee: Clever Tech Inc., Jesup, IA (US)

( * ) Notice: Subject to any disclaimer, the term of this patent is extended or adjusted under 35 U.S.C. 154(b) by 0 days.

(21) Appl. No.: 12/761,570

(22) Filed: Apr. 16, 2010

(65) Prior Publication Data

US 2011/0041472 A1    Feb. 24, 2011

Related U.S. Application Data

(63) Continuation-in-part of application No. 12/544,922, filed on Aug. 20, 2009, now Pat. No. 7,752,829.

(51) Int. Cl.
*A01D 45/02* (2006.01)
(52) U.S. Cl. ............................ 56/104; 56/110
(58) Field of Classification Search .................. 56/103, 56/113, 110, 119, 104, 94, 33; 460/32, 26, 460/31, 27, 29, 28; 241/282.1, 221
See application file for complete search history.

(56) References Cited

U.S. PATENT DOCUMENTS

| | | | | |
|---|---|---|---|---|
| 1,421,459 A | * | 7/1922 | Gritzmacher | 460/31 |
| 1,561,338 A | * | 11/1925 | Malmberg | 460/32 |
| 2,503,128 A | * | 4/1950 | Neighbour et al. | 56/50 |
| 2,534,685 A | * | 12/1950 | Shrader | 460/27 |
| 2,604,750 A | | 7/1952 | Fergason | |
| 2,618,113 A | * | 11/1952 | Hyman | 56/104 |
| 2,618,273 A | * | 11/1952 | Karlsson | 460/32 |
| 2,634,731 A | * | 4/1953 | Karlsson | 460/32 |
| 2,678,526 A | * | 5/1954 | Voss | 56/104 |
| 2,751,743 A | * | 6/1956 | Bauer | 56/104 |
| 2,768,626 A | * | 10/1956 | Pelowski | 460/32 |
| 2,821,058 A | * | 1/1958 | Jones | 56/108 |
| 2,947,133 A | * | 8/1960 | Hyman et al. | 56/110 |
| 3,090,388 A | * | 5/1963 | Schulze | 460/32 |
| 3,098,491 A | * | 7/1963 | Mitchell | 460/32 |
| 3,101,579 A | * | 8/1963 | Karlsson et al. | 56/105 |
| 3,139,887 A | * | 7/1964 | Karlsson et al. | 460/31 |
| 3,262,255 A | * | 7/1966 | Karlsson et al. | 56/107 |
| 3,304,702 A | * | 2/1967 | Russell | 56/104 |
| 3,451,200 A | * | 6/1969 | Phares | 56/33 |
| 3,462,928 A | * | 8/1969 | Schreiner et al. | 56/104 |
| 4,845,930 A | | 7/1989 | Dow | |
| 4,974,402 A | * | 12/1990 | Ostrup et al. | 56/102 |
| 5,009,061 A | * | 4/1991 | Heuling | 56/104 |
| 5,161,356 A | * | 11/1992 | Pick | 56/60 |

(Continued)

*Primary Examiner* — Árpád Fábián-Kovács
(74) *Attorney, Agent, or Firm* — Thomas E. Hill; Wildman, Harrold, Allen & Dixon LLP

(57) ABSTRACT

A corn head includes plural pairs of first and second laterally spaced rotating stalk rolls each having outer fluting and plural outer arrays of spaced knife members extending along the length of each stalk roll. Corn stalks are directed by rotating pick-up cones each disposed forward of a respective stalk roll into the space between adjacent stalk rolls, where the stalks are directed downwardly through the inter-roll space and are reduced by the cutting action of the rotating knives. Each pick-up cone and its associated stalk roll rotate in opposite directions as do the two stalk rolls. Disposed above and extending along the length of the stalk rolls are a closely spaced upper auger and stripper plate which remove an ear of corn from the stalk and direct the ear to the combine for further processing. A skid plate is disposed adjacent a lower, forward portion of each pick-up cone.

20 Claims, 14 Drawing Sheets

U.S. PATENT DOCUMENTS

| | | | | |
|---|---|---|---|---|
| 5,282,352 A * | 2/1994 | Schoolman | | 56/62 |
| 5,311,728 A * | 5/1994 | Schlueter | | 56/33 |
| 5,404,699 A * | 4/1995 | Christensen et al. | | 56/104 |
| 5,680,750 A * | 10/1997 | Stefl | | 56/62 |
| 6,050,071 A * | 4/2000 | Bich et al. | | 56/52 |
| 6,216,428 B1 * | 4/2001 | Becker et al. | | 56/104 |
| 6,349,528 B1 * | 2/2002 | Goering et al. | | 56/14.2 |
| 7,062,896 B2 * | 6/2006 | Resing et al. | | 56/64 |
| 7,073,316 B2 | 7/2006 | Resing et al. | | |
| 7,237,373 B2 * | 7/2007 | Resing et al. | | 56/104 |
| 7,373,767 B2 | 5/2008 | Calmer | | |
| 7,395,649 B2 * | 7/2008 | Wubbels et al. | | 56/52 |
| 7,493,745 B2 * | 2/2009 | Wubbles et al. | | 56/14.3 |
| 7,520,117 B2 | 4/2009 | Rieck et al. | | |
| 2003/0079459 A1 * | 5/2003 | Bongert et al. | | 56/104 |
| 2004/0016219 A1 * | 1/2004 | Calmer | | 56/51 |
| 2004/0107685 A1 * | 6/2004 | Resing et al. | | 56/119 |
| 2004/0123577 A1 | 7/2004 | Resing et al. | | |
| 2009/0113869 A1 * | 5/2009 | Cressoni | | 56/104 |
| 2010/0043371 A1 * | 2/2010 | Rieck et al. | | 56/14.7 |

* cited by examiner

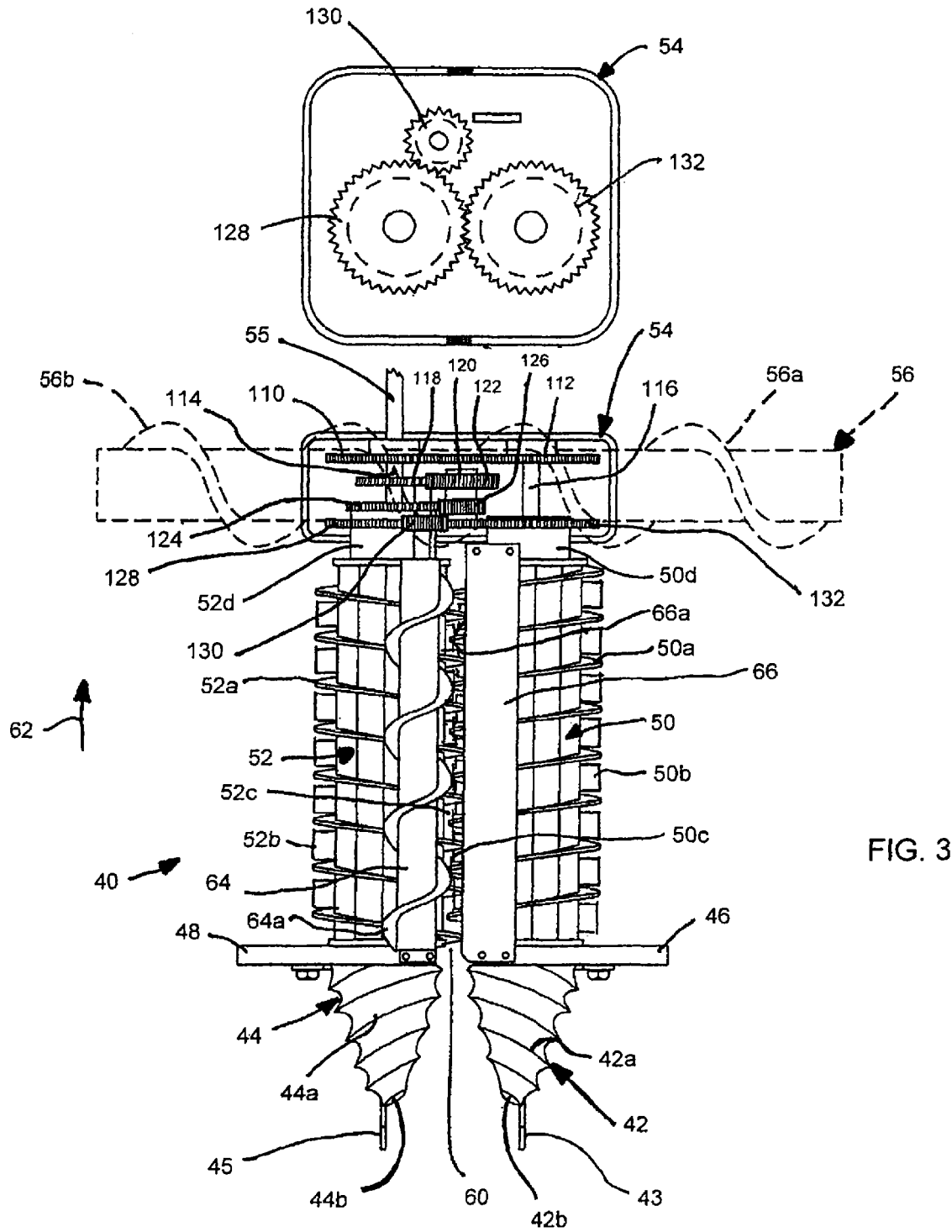

FIG. 5
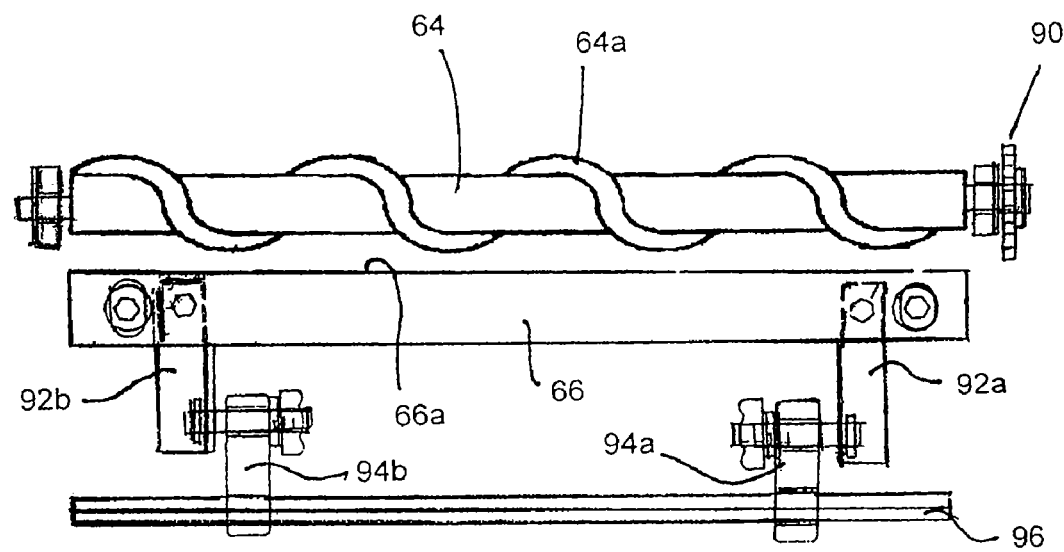
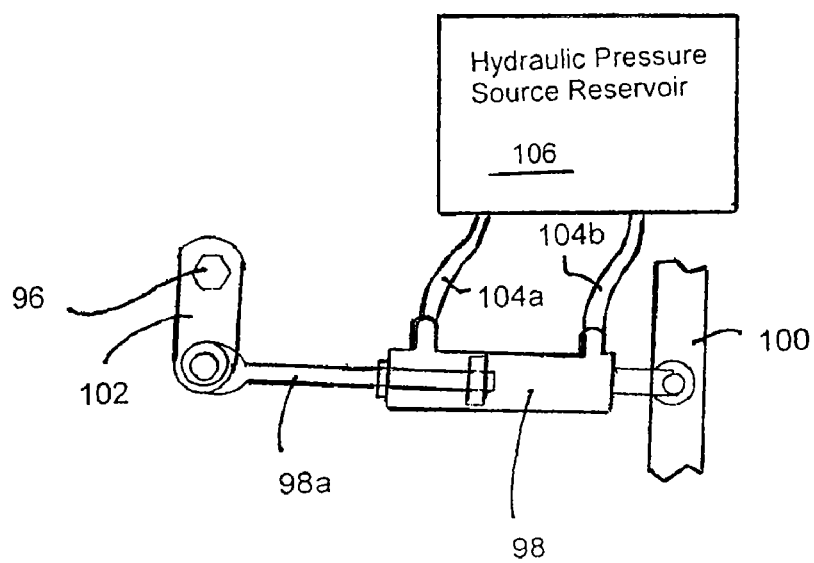
FIG. 5a

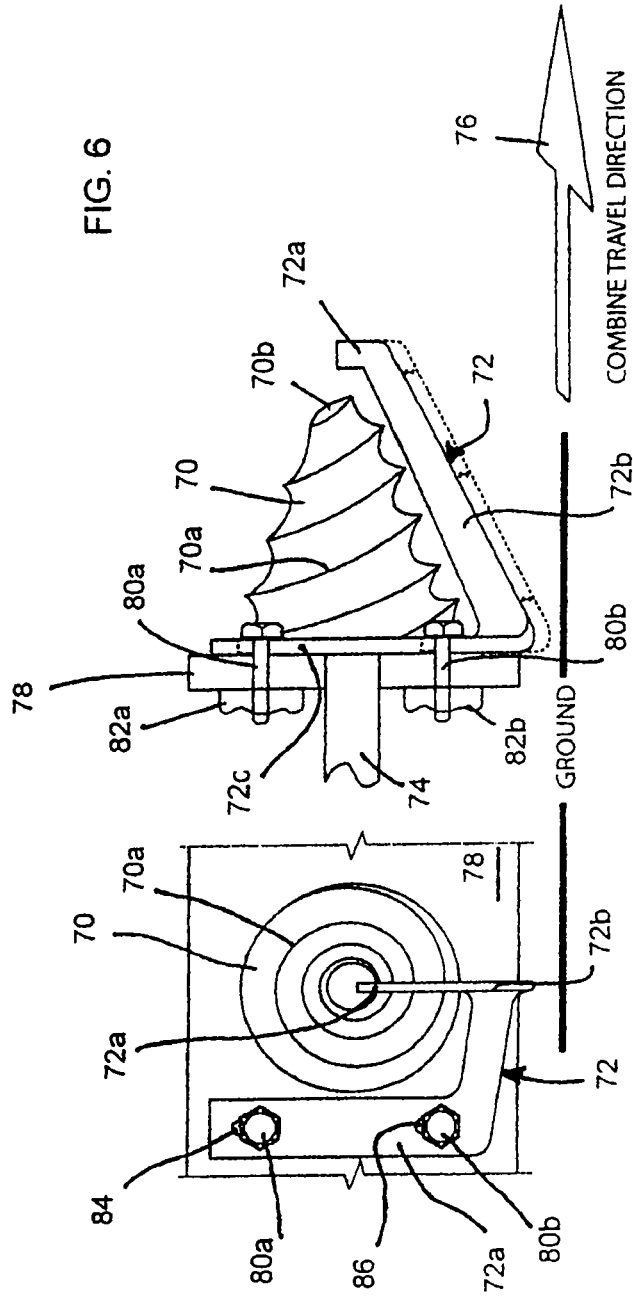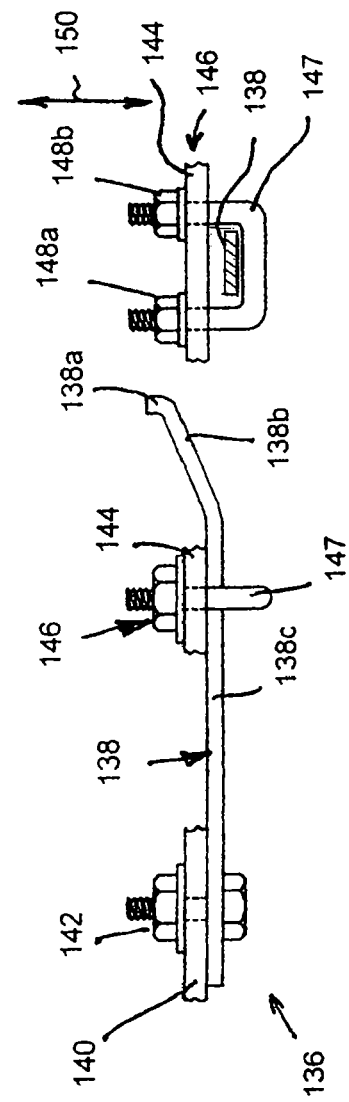

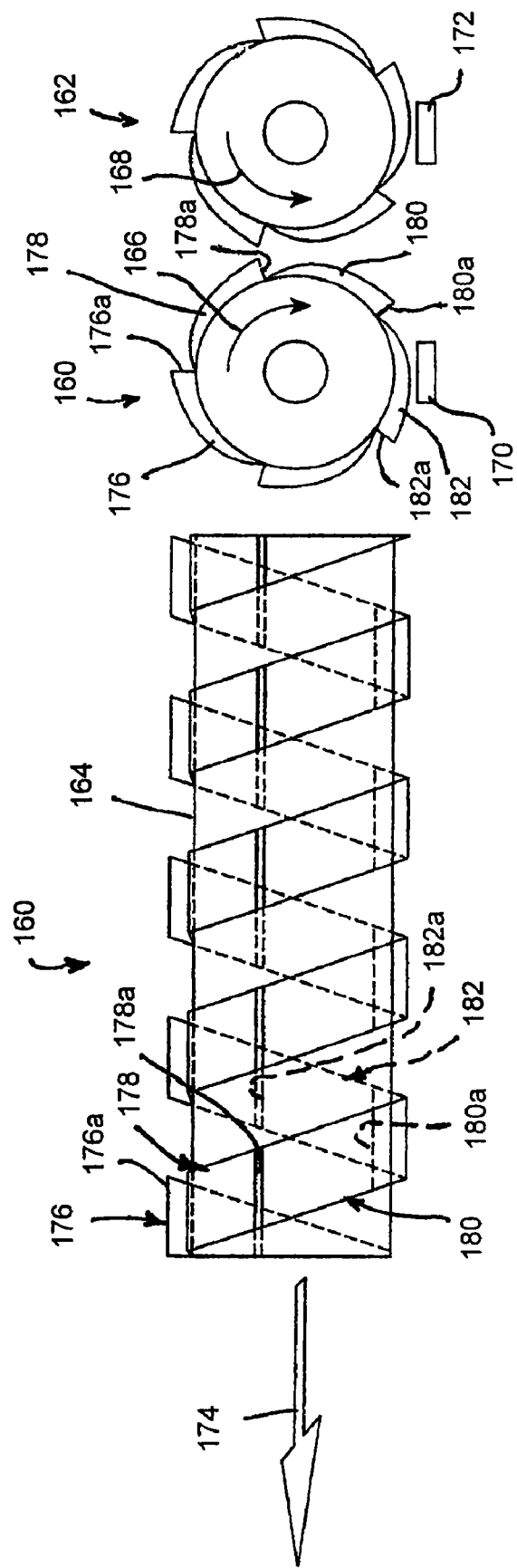

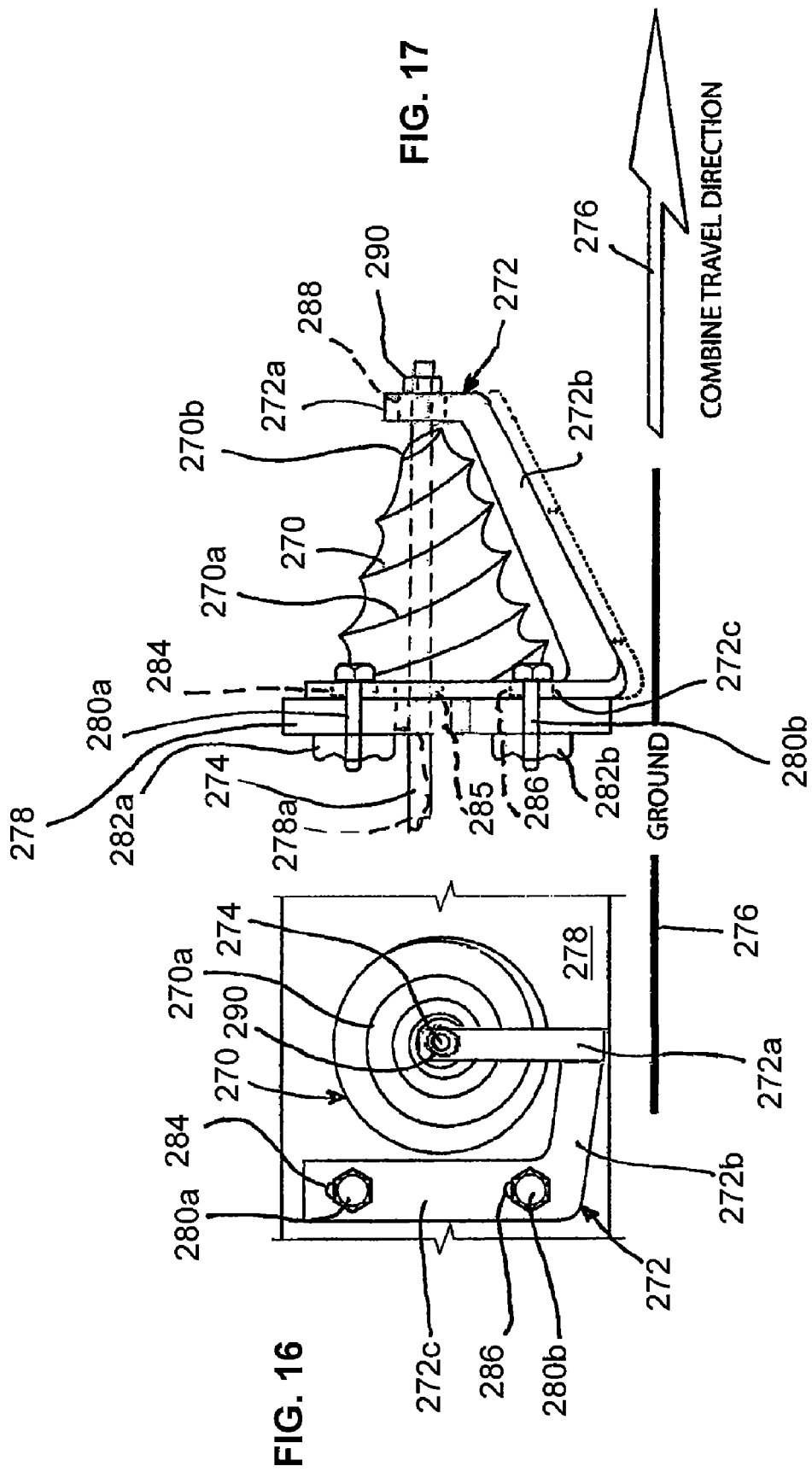

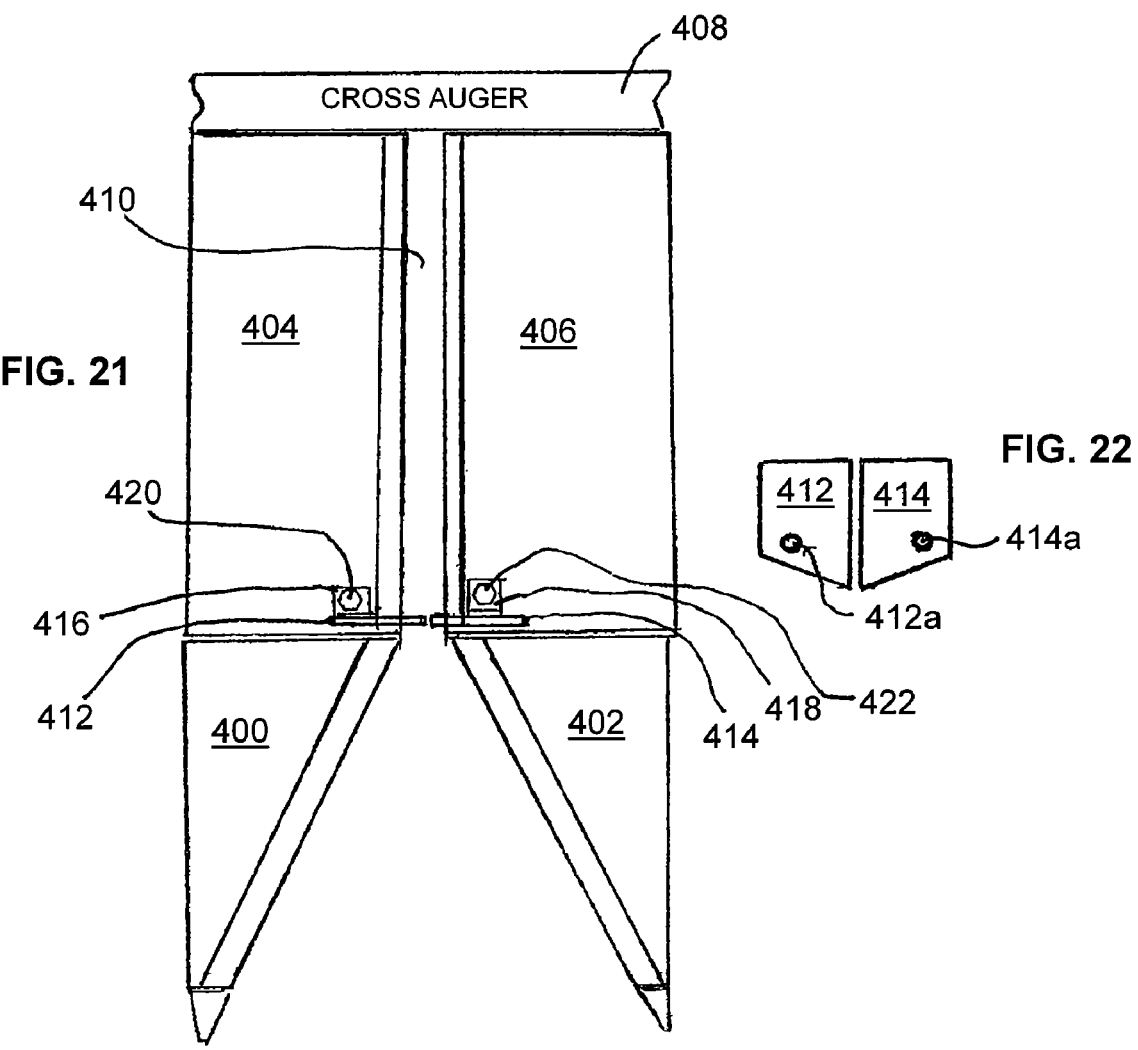

STALK ROLL AND STRIPPER ARRANGEMENT FOR CORN HEAD

CROSS REFERENCE TO RELATED APPLICATION

This application is a continuation-in-part of U.S. patent application Ser. No. 12/544,922 filed on Aug. 20, 2009.

FIELD OF THE INVENTION

This invention relates generally to the harvesting of agricultural crops, and is particularly directed to a corn head as used with a combine in the harvesting of corn.

BACKGROUND OF THE INVENTION

Corn is generally harvested using a corn head 10 as shown in the perspective view of FIG. 1. The corn head 10 is attached to a forward, or leading, end of a combine (not shown in the figure for simplicity) which receives and processes the ears of corn from the corn head. A typical corn head as shown for the corn head 10 in FIG. 1 includes a left end 12 and a right end 14 with plural spaced row units 30 disposed therebetween. Row dividers 16 are displaced through a field such that the individual rows of corn are directed into the gaps 18 between adjacent row dividers which retrieve, lift and direct the rows of corn stalks toward a respective one of the row units 30. Each row unit 30 typically includes the combination of a gathering chain 20 and stripper plates (not shown in FIG. 1 for simplicity) which raise and direct the crop into the ear separation and conveying chamber of an individual row units 30. The stripper plates center the corn plant between a pair of rotating, fluted stalk rolls for discharge onto the soil. The combination of the rotating stalk rolls and stripper plates separate the ears of corn from the remainder of the corn plant as the plant is directed downwardly between the stripper plates and rotating stalk rolls for discharge onto the soil. The thus separated ears of corn are then conveyed rearwardly by means of the gathering chains 20 toward and into what is commonly referred to as a "feeder house", which includes a trough 22 disposed generally transverse to the direction of travel of the combine and containing a rotating auger 24. Trough 22 is partially defined by a rear wall 26 having an opening 28 therein. Auger 24 includes first and second flute sections 24a and 24b which are configured so as to direct ears of corn deposited in trough 22 toward opening 28 in the rear wall 26 of the trough so as to discharge the ears of corn rearwardly in the combine for further processing.

The prior art corn head 10 shown in FIG. 1 suffers form several limitations. For example, the rotating gathering chains 20 which displace the separated ears of corn rearwardly tend to break due to excessive loading and foreign objects such as rocks and roots ingested by the corn head 10. Pieces of the broken gathering chains 12 tend to continue on a rearward path in the corn head 10 under the influence of the rotating stalk rolls and enter the combine causing damage or destruction to various combine components and resulting in operational failure. The rotating stalk roll is also subject to plugging, or stalling, when dense weeds or wet stalks are ingested. Any of the aforementioned interruptions in operation results in reduced productivity.

The present invention is intended to overcome the aforementioned limitations of the prior art by providing a corn head which operates without rotating gathering chains and affords protection from impact damage to, and eliminates clogging of, the pick-up cones in the leading stage, or crop ingestion portion, of the corn head.

OBJECTS AND SUMMARY OF THE INVENTION

Accordingly, it is an object of the present invention to eliminate the use of vegetation-gathering chains in a corn head incorporated in a combine.

It is another object of the present invention to facilitate the processing of corn stalks in a corn head including the separation and recovery of the ear of corn and the reduction and discharge of the corn stalk.

A further object of the present invention is to separate an ear of corn from a corn stalk by means of a combine corn head during harvesting in a reliable, efficient and effective manner without the use of vegetation-gathering chains in the corn head.

A still further object of the present invention is to increase the speed at which corn is harvested by a combine without reducing the corn recovery rate.

Yet another object of the present invention is to prevent crop residue from accumulating in a combine corn head during harvesting by improving the manner in which the corn stalks are separated from an ear of corn, are reduced to small pieces of vegetation, and are discharged form the combine.

Still another object of the prevent invention is to improve and facilitate the recovery of corn from down corn stalks lying on the ground during harvesting.

It is another object of the present invention to provide a corn head for use in a combine in the harvesting of corn which is easily adjusted to accommodate the processing of corn stalks having a wide range of diameters and conditions.

The present invention contemplates a row unit for use in a corn head attached to a combine and having the combination of a first auger and elongated trough aligned generally transverse to the direction of travel of the combine, said row unit comprising: first and second cylindrical rotating stalk rolls laterally disposed in closely spaced relation to one another, wherein each stalk roll has an intake end for receiving corn stalks and an opposed outlet end and the stalk rolls rotate in opposite directions, and wherein each stalk roll includes plural cutting elements disposed on its outer surface in a spaced manner for reducing the corn stalks to small pieces, and wherein each stalk roll further includes outer fluting for displacing the corn stalks from the stalk roll's intake end toward its outlet end, and wherein the cutting elements and the auger urge the corn stalks downward in a space between said first and second stalk rolls; a stripper plate disposed above and in closely spaced relation to the first stalk roll and extending substantially the length of the first stalk roll from its intake end to its outlet end; a second auger disposed above and in closely spaced relation to the second stalk roll and extending substantially the length of the second stalk roll from its input end to its outlet end, wherein the second auger is further disposed in closely spaced relation to the stripper plate, and wherein the stripper plate removes ears of corn from the corn stalks and said auger displaces the thus removed ears of corn rearwardly to the first auger and trough combination.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 3 is a top plan view of the pair of rotating stalk rolls shown in FIG. 2 which further illustrates the combination of an auger and a stripper plate in accordance with the present invention;

FIG. 4 is a front plan view of the gear arrangement in the gear box shown in FIG. 3 used for driving the stalk roll and pick-up cone combinations of the present invention;

FIG. 5 is a plan view of the combination of an auger and a stripper plate for use in removing ears of corn from corn stalks in accordance with the present invention;

FIG. 5a is a simplified schematic diagram for changing the separation distance between the auger and stripper plate shown in FIG. 5 to accommodate corn stalks having a range of diameters;

FIG. 6 is a side elevation view of a skid plate disposed adjacent a pick-up cone for protecting the pick-up cone from impact damage and preventing vegetation from plugging of the corn head in accordance with another aspect of the present invention;

FIG. 7 is a front plan view of the mounting arrangement for the pick-up cone stripper plate shown in FIG. 6;

FIG. 8 is a simplified side plan view of another embodiment of a stripper plate for use with a pick-up cone in accordance with the present invention;

FIG. 8a is a transverse sectional view of the stripper plate of FIG. 8 showing additional details of the stripper plate mounting arrangement;

FIG. 9 is an end-on view of a pair of stalk rolls having plural spaced fluting members disposed thereon each having an integrated knife edge for reducing vegetation encountered by the stalk roll;

FIG. 10 is a side elevation view shown partially in phantom of one of the stalk rolls illustrated in FIG. 9;

FIGS. 16 and 17 are respectively front plan and side elevation views of another embodiment of a pick-up cone, or rotating transport vane, and a mounting arrangement therefor;

FIG. 21 is top plan view of a pair of row divider and row unit combinations, each having a respective ear retainer attached to an upper portion thereof;

FIG. 22 is a front plan view of a pair of ear retainers adapted for mounting to a respective upper portion of a row unit in accordance with another embodiment of the present invention;

DETAILED DESCRIPTION OF THE PREFERRED EMBODIMENTS

Figure 1:
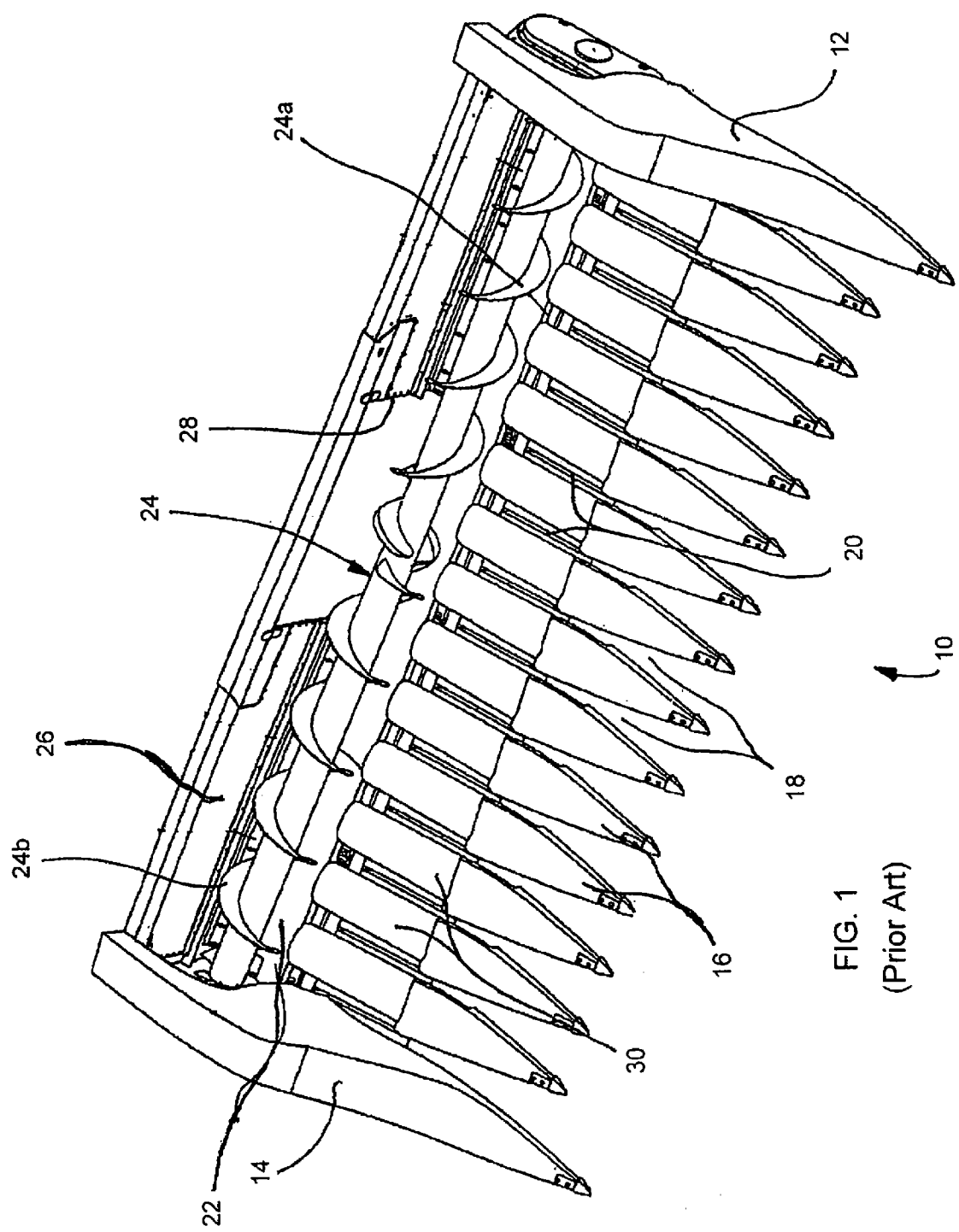
FIG. 1 is an upper perspective view of a conventional corn head adapted for mounting to a forward portion of a combine as currently used in the harvesting of corn.
Figure 2:
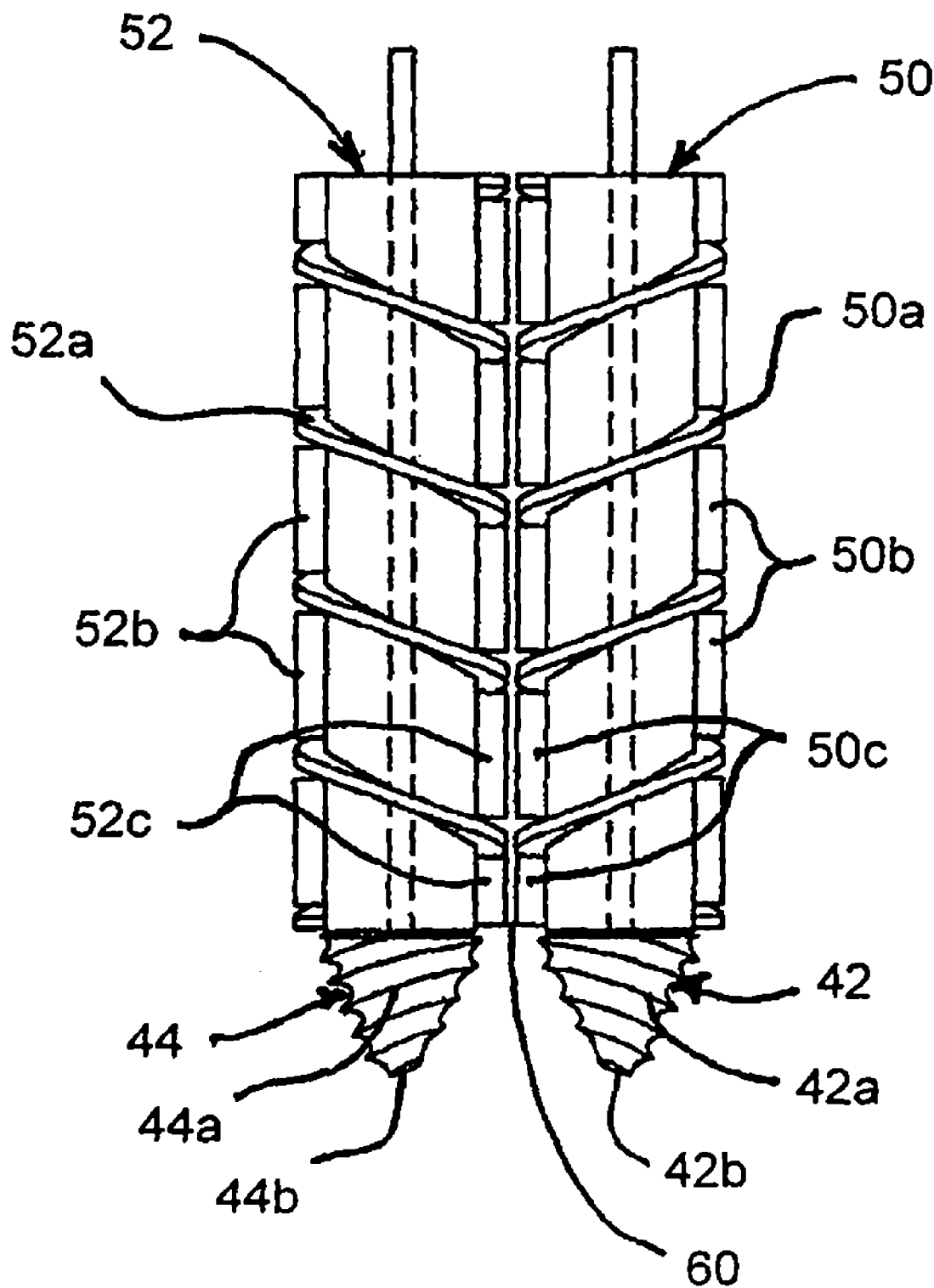
FIG. 2 is a top plan view of a pair of rotating stalk rolls and pick-up cones intended for use in a row unit of a corn head in accordance with the principles of the present invention.
Figure 3A:
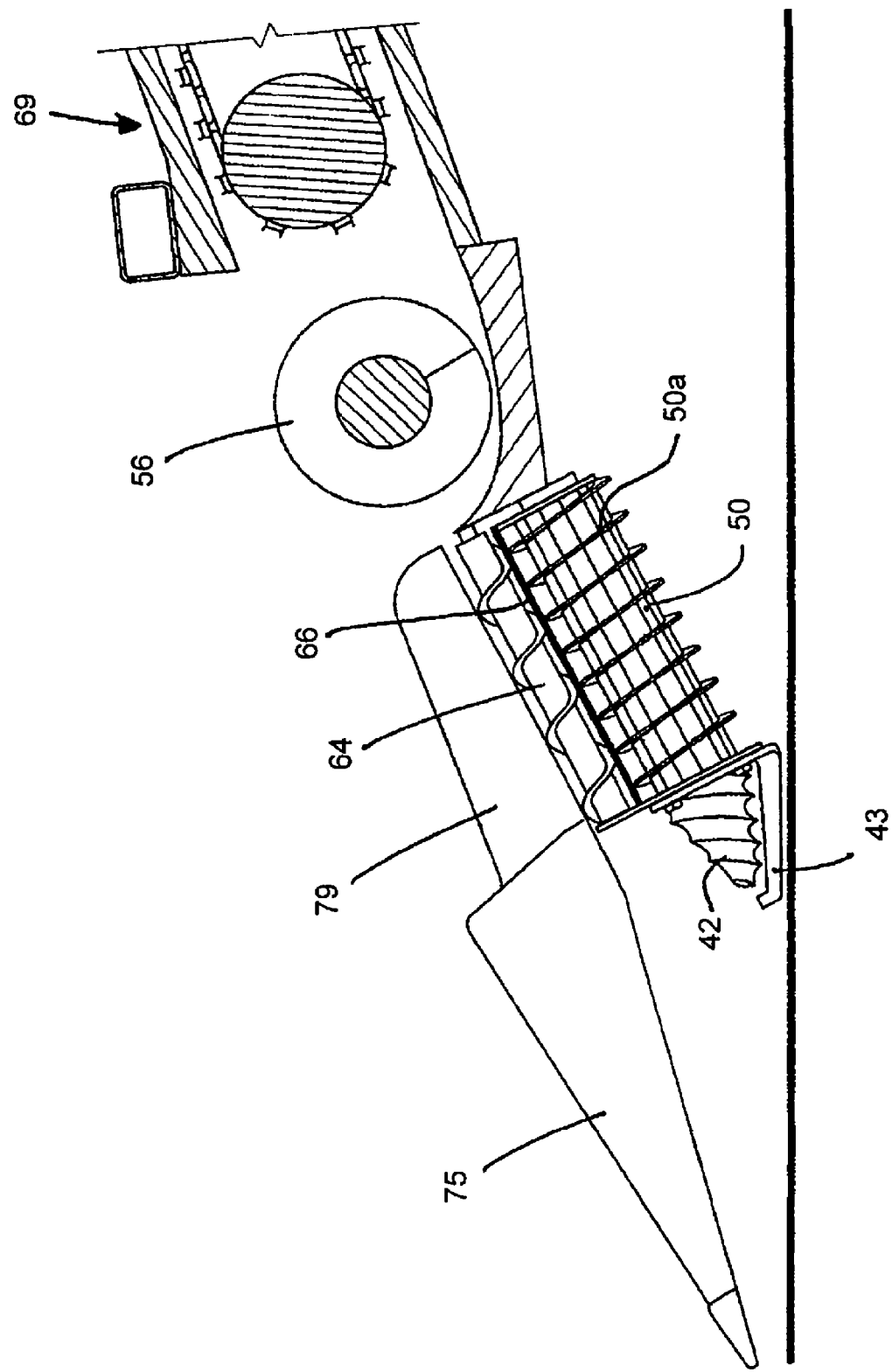
FIG. 3a is a side elevation view of the arrangement of FIG. 3 illustrating additional details of the inventive corn head installation on a combine.

Referring to FIG. 2, there is shown a top plan view of a row unit 40 incorporating left and right pick-up cones 42 and 44 and left and right stalk rolls 50 and 52 in accordance with the present invention. FIG. 3 is a top plan view of the aforementioned combination of pick-up cones and stalk rolls as well as an auger 64 and a stripper plate 66, also in accordance with the present invention. FIG. 3a is a side elevation of the arrangement of FIG. 3 illustrating additional details of the inventive corn head installation on a combine.

The left and right pick-up cones 42, 44 include respective outer fluting 42a and 44a as well as respective generally pointed end portions 42b and 44b oriented in the direction of travel of the combine. The first and second pick-up cones 42, 44 are adapted for engaging and lifting corn stalks lying on the ground and directing these corn stalks into the combination of the first and second stalk rolls 50 and 52. The left and right pick-up cones 42, 44 are coupled to and supported by left and right structural support members 46 and 48, respectively, which form a part of row unit 40. Left and right pick-up cones 42, 44 rotate in opposite directions so as to direct ingested corn stalks in the space between the two pick-up cones in an upward direction, as well as in aft direction (or upward as shown in FIG. 3), toward the space 60 between upper, adjacent portions of the left and right stalk rolls 50, 52. As shown in the side elevation view of FIG. 3a, the combination of the left pick-up cone 42 and the left stalk roll 50 as well as the right pick-up cone 44 and the right stalk roll 52 (although the latter two elements are not shown in the figure) are disposed below the combination of a row divider 75 and a row crop cover 70 in the corn head. The combination of an auger 64 and a stripper plate 66, described in detail below, are also disposed beneath the row divider 75 and the row crop cover 70. The ears of corn separated from the corn stalks are provided to the combine transverse auger 56 for delivery to subsequent processing stages 69 in the combine.

The left and right stalk rolls 50, 52 are provided with respective fluting 50a, and 50b extending the length of the stalk rolls and configured to move cornstalks in a rearward direction within the row unit 40. The left and right stalk rolls 50, 52 also rotate in opposite directions so as to direct corn stalks to the space above and between the two stalk rolls which displace the corn stalk residue to the space between the rotating stalk rolls for discharge on the soil. The fluting of each pick-up cone is in an opposite direction to the fluting of its associated stalk roll. Thus, the fluting of the left pick-up cone 42 is opposite in direction to the fluting of the left stalk roll 50, while the fluting of the right pick-up cone 44 is opposite in direction to the fluting of the right stalk roll 52. Each pick-up cone also rotates in a direction opposite to that of its associated stalk roll. This can be accomplished using coaxial drive shafts which are conventional in design and operation and are described in greater detail below.

Also disposed on the outer surface of the left stalk roll 50 are first and second spaced linear arrays of knives 50b and 50c. The spaced linear arrays of knives 50b and 50c are disposed on opposed outer portions of the left stalk roll 50 and are positioned between adjacent portions of the outer fluting 50a on the left stalk roll. Right stalk roll 52 is similarly provided with fluting 52a and first and second arrays of spaced, aligned knives 52b and 52c which are disposed on opposed outer portions of the right stalk roll and extend the length of the stalk roll. The respective aligned arrays of knives 50b, 50c and 52b, 52c of the left and right stalk rows 50, 52 reduce the ingested corn stalks to small pieces of vegetation and direct the reduced vegetation toward the space between the two stalk rollers for discharge downward from the corn head 40. Left and right structural/support members 46, 48 are respectively coupled to and provide support for the forward portions of the left and right stalk rolls 50, 52. In addition, attached to respective forward portions of the left and right structural support members 46, 48 are left and right skid plates 43 and 45 disposed adjacent the left and right pick-up cones 42 and 44. The configuration and operation of skid plates 43 and 45 is described in detail below.

Row unit 40 further includes the combination of an auger 64 and a stripper plate 66 in accordance with the present invention. Auger 64 is provided with outer fluting 64a along the length thereof, while stripper plate 66 is provided with a cutting edge 66a extending the length thereof and in facing relation to the auger. The combination of rotating auger 64 and stripper plate 66 functions to remove by cutting action an ear of corn from each corn stalk and to move the thus severed ears of corn rearwardly toward a transverse trough within which is disposed combine auger 56.

Row unit 40 also includes a gear box 54 containing plural inter-connected gears for converting the rotational displacement of an input shaft 55 to a rotational motion of the left pick-up cone 42 and left stalk roll 50, as well as the right pick-up cone 44 and the right stalk roll 52, and the upper auger 64. A top view of the gears within the gear box 54 is shown in FIG. 3, and a front plan view of the gears within the gear box is shown FIG. 4.

Input shaft 55 is rotated by the combine and is coupled to and rotates a first gear 110 and is further connected to and continuous with a first inner drive shaft in 114. The first inner drive shaft 114 is coupled to and rotates the right pick-up cone 44. First gear 110 is further coupled to and rotationally displaces a second gear 112 which is coupled to a second inner drive shaft 116. The second inner drive shaft 116 is coupled to and rotates the left pick-up cone 42. The coupling between the first gear 110 and the second gear 112 is such that the first and second gears rotate in opposite directions, as do the first and second inner drive shafts 114, 116 which rotationally drive the left and right pick-up cones 42, 44 in opposite directions.

A third gear 118 attached to input shaft 55 is coupled to a fourth gear 122 which is positioned on a coupling shaft 120. Similarly, a fifth gear 124 is positioned on the first inner drive shaft 114 and is coupled to a sixth gear 126 also disposed on coupling shaft 120. The rotational output of the third through sixth gears 118-126 is provided to the combination of a seventh gear 128, an eighth gear 130 and a ninth gear 132. Seventh gear 128 is coupled to an enlarged input drive shaft 52d of the right stalk roll 52. Similarly, ninth gear 132 is connected to an enlarged input drive shaft 50d of the left stalk roll 50. The manner in which the seventh and ninth gears 128, 132 are coupled together provides opposite directions of rotation for the left and right stalk rolls 50, 52. Eighth gear 130 is coupled to upper auger 64 for urging ears of corn separated from corn stalks rearwardly toward the combination of trough 68 and transverse auger 56 described earlier.

Referring to FIG. 5, there are shown an upper plan view of the combination of auger 54 and the stripper plate 66 and the arrangement for moving the stripper plate relative to the auger so as to adjust the space between these two components to accommodate corn stalks having a range of diameters. Additional details of the position adjusting arrangement for the stripper plate 66 are shown in FIG. 5a. As shown in FIG. 5, auger 64 is provided with outer fluting 64a for engaging and displacing ears of corn as described above and a drive gear 90 for rotationally displacing the auger. Stripper plate 66 is provided with an inner knife edge 66a and is attached to and supported by first and second support arms 92a and 92b. First and second support arms 92a, 92b are respectively coupled by means of first and second coupling brackets 94a and 94b to a rotatable six-sided, or hex, shaft 96. Hex shaft 96 is connected by means of a coupling bracket 102 to a distal end of an extendible rod 98a of a hydraulic cylinder 98 as shown in FIG. 5a. The opposing end of a hydraulic cylinder 98 is fixedly attached to a structural support member 100 of the corn head. Connected to the hydraulic cylinder 98 are first and second hydraulic lines 104a and 104b which, in turn, are connected to a hydraulic pressure source/reservoir 106. Hydraulic fluid provided under pressure to cylinder 98 via line 104b extends its rod 98a, while hydraulic fluid under pressure provided to the cylinder via hydraulic line 104a retracts the hydraulic cylinder rod. Extension and retraction of the hydraulic cylinder's rod 98a causes rotational displacement of hex shaft 96 about its longitudinal axis and relative displacement between stripper plate 66 and auger 64. It is in this manner that the space between stripper plate 66 and auger 64 may be varied to accommodate corn stalks having different diameters.

A pick-up cone 270 attached to a combine traveling in the direction of arrow 276 and having a skid plate 272 disposed in closely spaced relation thereto in accordance with another embodiment of the present invention. As in the previously described embodiments, rotating pick-up cone 270 is provided with outer fluting 270a and is rotationally driven by means of a rotating shaft 274 to which it is connected. Rotating shaft 274 extends through an aperture 285 within a structural support member 278 within the corn head. Attached to the structural support member 278 is the skid plate 272. Skid plate 272 is preferably comprised of a unitary structure and includes a forward section 272a, a lower section 272b and an aft section 272c. The forward section 272a of skid plate 272 covers the forward, pointed portion 270b of the pick-up cone 270, while the skid plate's lower section 272b covers the lower portion of the pick-up cone. The skid plate's aft section 272c is provided with a pair of apertures 284 and 286 (shown in dotted line form) and is adapted for mounting to the structural support member 278 within the row unit by means of the combination of a first bolt 280a and first nut 282a and a second bolt 280b and a second nut 282b. The skid plate's aft section 272c is further provided with a third aperture 285 disposed intermediate the first upper aperture 284 and the second lower aperture 286. Rotating shaft 274 extends through the intermediate aperture 285 of the skid plate's aft section 272c. Each of the three apertures 284, 285 and 286 within the aft section 272 of skid plate 272 is vertically elongated so as to allow for changing the spacing between pick-up cone 270 and the skid plate's lower section 272b as shown by the dotted lines in FIG. 17. The skid plate's forward section 272a also includes a vertically elongated aperture 288 (also shown in dotted line form) through which a forward portion of rotating shaft 274 extends to accommodate vertical adjustment of skid plate 272 relative to pick-up cone 270. A bearing coupler 290 is attached to a forward end of rotating shaft 274 for securely connecting the rotating shaft to the forward section 272a skid plate 272 while allow the shaft to freely rotate. Skid plate 272 functions to protect pick-up cone 270 from damage or destruction caused by impact with the ground or with an object in the field such as a rock. Skid plate 272 also prevents weeds and other vegetation on the surface of the soil, including wet corn stalks, from clogging the pick-up cone 270 as well as its associated stalk roll disposed aft of the pick-up cone.

Referring to FIG. 8, there is shown a side plan view of another embodiment of a skid plate installation 136 in accordance with the present invention. Skid plate installation 136 connects a generally elongated, angled skid plate 138 to first and second structural support members 140 and 144. The first and second structural support members 140, 144 are shown in FIG. 8 as being two separate members, but could equally as well be different portions of the same structural support member. Skid plate 138 includes a forward section 138a, a lower section 138b and an aft section 138c. The forward section 138a of skid plate 138 is disposed adjacent the leading, pointed end portion of a pick-up cone which is not shown in the figure for simplicity. The lower section 138b of skid plate 138 is disposed adjacent a lower, forward portion of the rotating pick-up cone. The aft section 138c of skid plate 138 is coupled by means of a nut and bolt combination 142 to the first structural support member 140. The skid plate's aft section 138c is further coupled to the second structural support section 144 by means of a U-bolt installation 146. A sectional view of the skid plate installation 136 is shown in FIG. 8a and illustrates additional details of the coupling of the skid plate 138 to the second structural support member 144. The second structural support member 144 is provided with a pair of apertures, each adapted to receive a respective linear portion of U-bolt 147. First and second nuts 148a and 148b are used to attach the U-bolt 147 to the second structural support member 144. Skid plate 138 is disposed between a lower surface of the second support member 144 and the curved portion of U-bolt 147, with space provided between the skid plate and the curved portion of the U-bolt to allow the skid plate to be displaced in the directions of arrow 150 upon impact with an obstruction in the filed. Allowing the skid plate 138 to be deflected in a vertical direction upon impact with an obstruction allows the impact force to be transferred via the skid plate to the structure of the corn head thus increasing the operating lifetime of the skid plate.

Referring to FIG. 9, there is shown a pair of stalk rolls 160 and 162 incorporating plural spaced fluting members thereon in accordance with another embodiment of the present invention. The first stalk roll 160 rotates in the direction of arrow 166, while the second stalk roll 162 rotates in a second, opposed direction shown by direction arrow 168. Disposed adjacent lower portions of the first and second stalk rolls 160, 162 are respective first and second weed strippers 170 and 172 which remove excess vegetation from the stalk rolls and prevent clogging of the stalk rolls as described above.

FIG. 10 is a side elevation view of the first stalk roll 160 shown partially in phantom. The following discussion is limited to the first stalk roll 160, as the second stalk roll 162 is the same as the first stalk roll in configuration and operation. First stalk roll 160 includes an elongated, generally cylindrical inner shaft 164 having plural spaced fluting members disposed about its outer periphery and extending the length thereof. It is by means of these fluting members that the rotating stalk roll 160 displaces ingested vegetation in the direction of arrow 174 toward the combine feeder house (not shown for simplicity). First, second, third and fourth fluting members 176, 178, 180 and 182 are shown in FIGS. 9 and 10. Additional fluting members are disposed along the remaining length of the first stalk roll 160 as shown in FIG. 10, but only the four aforementioned fluting members are visible in the end-on view of the first stalk roll shown in FIG. 9 and only the four aforementioned fluting members are described in detail herein. Each fluting member extends outwardly from the stalk roll's inner shaft 164 in proceeding from a first end to a second, upraised end which includes a cutting knife edge. Thus, first fluting member 176 terminates in a first cutting knife edge 176a. Similarly, second, third and fourth fluting members 178, 180 and 182 respectively terminate in second, third and fourth cutting knife edges 178a, 180a and 182b. The upraised, flat cutting knife edges 176a-182a of each of these fluting members sever the ingested vegetation to small particle size to facilitate discharge of the thus reduced vegetation to the soil. In addition, the flat portions of each of the of the four cutting knife edges 176a-182a facilitate displacement of the vegetation about each of the first and second stalk rolls 160, 162 to the space located between the stalk rolls for discharge from the stalk rolls onto the soil. The configuration of the first through fourth fluting members 176-182 thus allows the rotating stalk rolls 160, 162 to ingest additional amounts of vegetation without clogging or delaying the separation of the ears of corn from the corn stalks.

Figure 11:
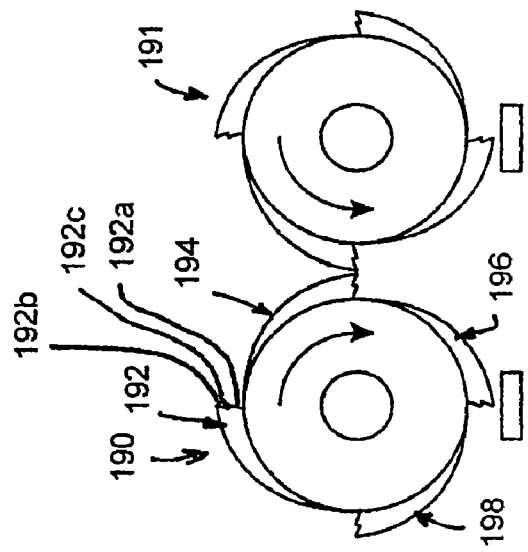
FIG. 11 is an end-on view of a pair of stalk rolls incorporating plural spaced fluting members having coined edge portions thereon in accordance with another embodiment of the present invention.
Figure 12:
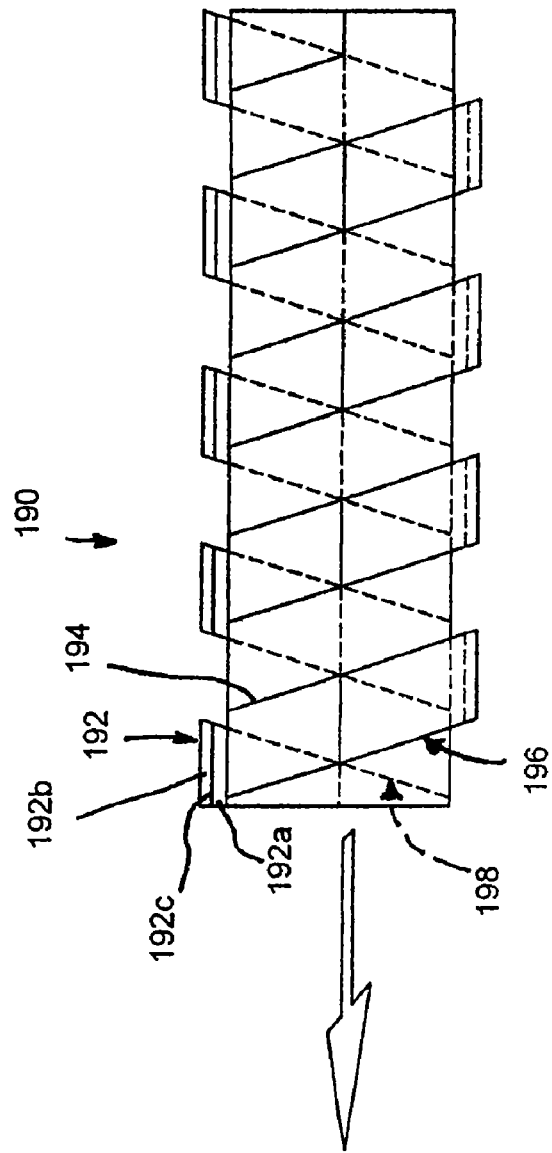
FIG. 12 is a side elevation view of one of the stalk rolls illustrated in FIG. 11.

Referring to FIG. 11, there is an end-on view of yet another embodiment of a pair of stalk rolls 190, 191 in accordance with the principles of the present invention. Stalk rolls 190, 191 differ from stalk rolls 160 and 162 shown in FIG. 9 only in the cutting edge portions of their fluting members and stalk rolls 190 and 191 are identical in configuration and operation. Therefore, only the cutting edge portions of stalk roll 190 are described in detail. In the embodiment shown in FIG. 11 and FIG. 12, wherein stalk roll 160 is viewed from the space between the two stalk rolls as viewed in FIG. 11, stalk roll 190 is provided with four fluting members 192, 194, 196 and 198 equally spaced around its outer periphery. The configuration and operation of each of these four fluting members will be described in terms of the first fluting member 192, as all of these fluting members are configured and operate similarly. First fluting member 192 includes a first inner section 192a and a second outer section 192b. Disposed between and connecting the first inner section 192a and the second outer section 192b is a third intermediate section 192c. The third intermediate section 192 is generally transverse to the first inner and second outer sections 192a and 192b. This offset spacing of the first inner and second outer sections 192a, 192b provides the first fluting member 192 with a step configuration which enhances the engagement of the fluting members on the rotating stalk roll with the ingested vegetation so as to facilitate rearward movement of the vegetation toward the combine feeder house and discharge of the reduced vegetation through the inter-stalk roll space. While each of the fluting members 192-198 is described in terms of a first inner section, a second outer section and a third intermediate section, each of the fluting members is preferably comprised of a unitary structure formed of a single piece of high strength coined metal and is tapered in proceeding from its coined edge portion rearwardly toward the combine feeder house as in the previously described embodiments. While the embodiments shown in FIGS. 9 and 10 and FIGS. 11 and 12 include plural, spaced fluting members disposed about the outer portion and extending the length of the stalk roll, the present invention is not limited to this configuration. The present invention also contemplates plural fluting members disposed about the outer portion of the stalk roll, with each of the circumferentially spaced fluting members also extending the full length of the stalk roll and not arranged in the form of plural spaced fluting members disposed along the length of the stalk roll.

Figure 13:
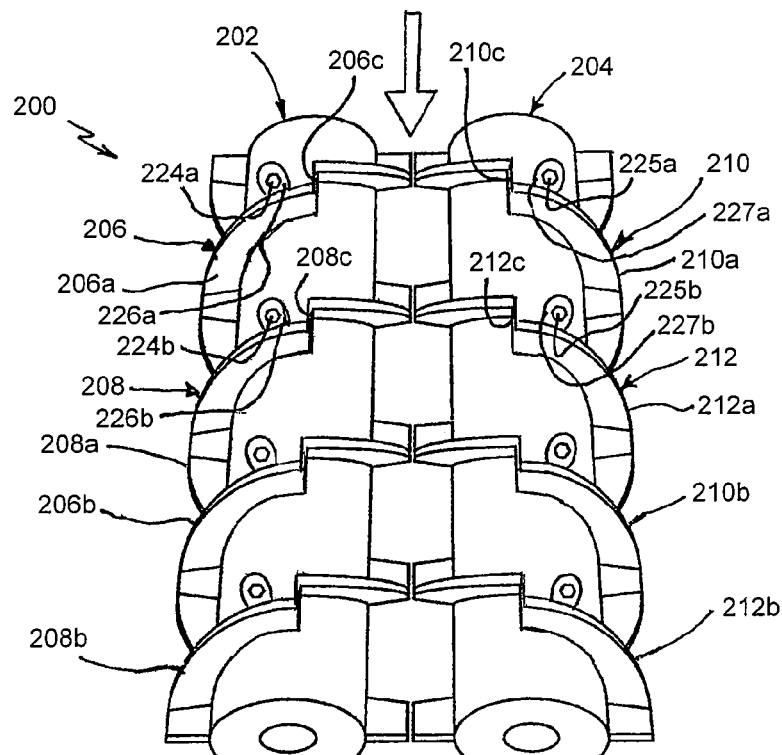
FIG. 13 is an upper perspective view of a pair of aligned, closely spaced stalk rolls in accordance with another embodiment of the present invention.
Figure 14:
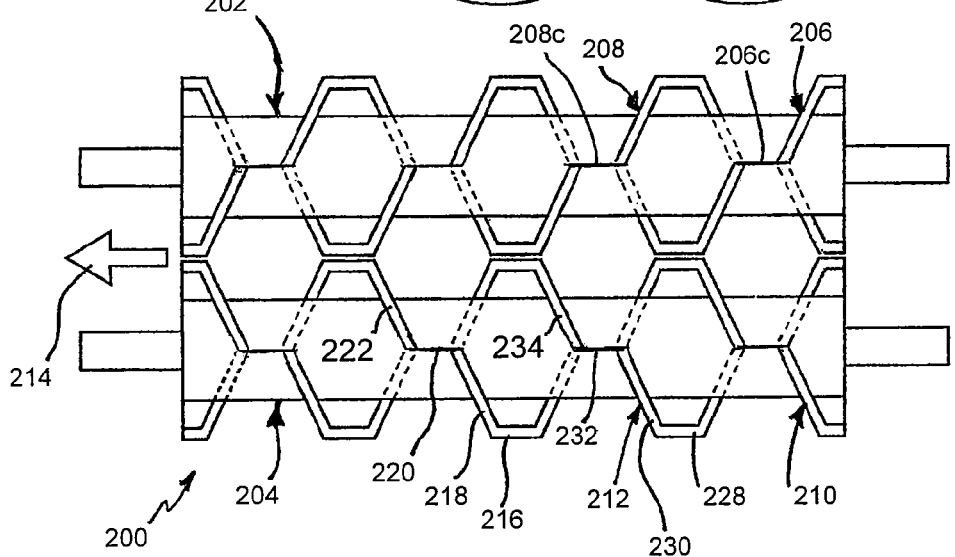
FIG. 14 is a top plan view of the pair of stalk rolls shown in FIG. 13.
Figure 15:
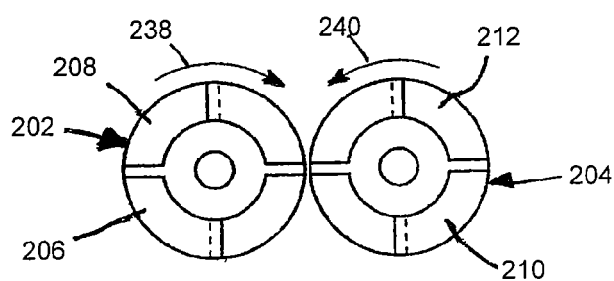
FIG. 15 is a front plan view of the pair of stalk rolls shown in FIGS. 13 and 14 illustrating the direction of rotation of the stalk rolls.

Referring to FIGS. 13, 14, and 15, there are respectively shown upper perspective, top plan and front plan views of a stalk roll arrangement 200 in accordance with another embodiment of the present invention. Stalk roll arrangement 200 includes first and second laterally spaced stalk rolls 202 and 204. Each of the stalk rolls preferably has a respective fluted pick-up cone attached to its forward end as in the previously described embodiments, but these are not shown in FIGS. 13, 14 and 15 as these components have been fully described above. The first stalk roll 202 includes first and second spiral fluting 206 and 208 disposed about its outer periphery and extending between its opposed ends. Similarly, the second stalk roll 204 includes third and fourth spiral fluting 210 and 212 disposed about its outer peripheral and extending from its forward end to its aft end. As in the previously described embodiments, the first and second spiral fluting 206, 208 on the first stalk roll 202 and the third and fourth spiral fluting 210, 212 and the second stalk roll 204 allow the two stalk rolls to direct ears of corn along the length of the stalk rolls in the direction of arrow 214 shown in FIG. 14 from an input end of the stalk rolls to its opposed output end during rotation of the stalk rolls. As shown in FIG. 15, the two stalk rolls are rotationally driven in opposite directions, with the first stalk roll 202 rotating in the direction of arrow 238 and the second stalk roll 204 rotating in the direction of arrow 240.

First and second spiral fluting 206, 208 of the first stalk roll 202 are displaced 180° from one another about the outer circumferential lateral surface of the stalk roll. Similarly, third and fourth spiral fluting 210, 212 are disposed 180° from one another on the outer circumferential lateral surface of the second stalk roll 204. Thus, for the case of the first stalk roll 202 shown in FIG. 13, in proceeding downwardly in the figure, a first portion 206a of first spiral fluting 206 is shown, followed by a second portion 208a of the stalk roll's second spiral fluting 208. A first portion of the stalk roll's second spiral fluting 208 is not shown in FIG. 13 because it is positioned on a lower portion of the first stalk roll 202 as viewed in FIG. 13 and is thus not visible. Similarly, a second portion of the stalk roll's first spiral fluting 206 is not shown in FIG. 13 because it is positioned on a lower surface portion of the first stalk roll 202 as viewed in this figure and is also not visible.

Each spiral fluting includes a series of four flat portions which are repeated throughout the length of the fluting along the entire length of the associated stalk roll as shown for the case of the second stalk roll 204 in FIG. 14. Thus, first, second, third and fourth flat portions 228, 230, 232 and 234 of the fourth spiral fluting 212 on the second stalk roll 204 are connected together in a nonlinear manner about the second stalk roll so as to provide a step-like spiral arrangement about the stalk roll. The first and third flat portions 228 and 232 are aligned along the length, or rotational axis, of the second stalk roll 204. The second and fourth flat portions 230 and 234 of fourth spiral fluting 212 are aligned at an angle relative to the longitudinal axis of the second stalk roll 204 in the direction in which ears of corn are displaced, i.e., in the direction of arrow 214. Due to the rotation of the first and second stalk rolls 202, 204, the first and third flat portions 228, 232 of the fourth spiral fluting 212 (and similar flat portions of the third spiral fluting 210 on the second stalk roll as well as the first and second spiral flutings 206, 208 on the first stalk roll), corn plant residue is displaced in the direction of arrows 238 and 240 shown in FIG. 15 to the space between the two rotating stalk rolls. On the other hand, the second and fourth flat portions 230, 234 of the fourth spiral fluting 212 (as well as corresponding angled flat portions of the third spiral fluting 210 on the second stalk roll 204 and on the first and second spiral flutings 206, 208 of the first stalk roll 202) urge the ears of corn in the direction of arrow 214 in FIG. 14 toward the output end of the pair of rotating stalk rolls. Thus, the spiral fluting disposed about the outer peripheral of each of the first and second stalk rolls 202, 204 displaces crop residue to the space between the two rotating stalk rolls for discharge onto the ground, while simultaneously displacing the ears of corn rearwardly toward the output end of the stalk rolls to the combine's elongated transverse trough described above.

As shown in FIGS. 13 and 14, the flat portions of the fluting aligned with the longitudinal axis of its associated stalk roll are very thin in a preferred embodiment. Thus, flat portions 228, 232 of the fluting on the second stalk roll 204 and flat portions 206c, 208c on the first stalk roll 202 are in the form of a very thin member having a sharpened outer edge. The sharpened outer edge of each of these flat portions of the fluting on the stalk which are aligned with the stalk roll's longitudinal axis serve not only to displace the crop residue toward the space between the two rotating stalk rolls, but also cut and reduce the size of the crop residue to facilitate its discharge between the stalk rolls on to the ground and promote its decomposition in a field. Also as shown in FIG. 13, the individual fluting sections are securely attached to the outer periphery of the first and second stalk rolls 202, 204 by means of plural tabs attached to the fluting through which a respective coupling pin is inserted and securely connected to the stalk roll. Thus, the first and second spiral fluting 206, 208 on the first stalk roll 202 are securely mounted to the outer periphery of the stalk roll by means of respective plural combinations of a first tab 226a and first mounting pin, or bolt, 224a, and a second tab 226b and a second mounting pin 224b. Similarly, the first and second spiral fluting 210, 212 on the second stalk roll 204 are securely mounted to the outer periphery of the stalk roll by means of respective plural combinations of a first tab 227a and first mounting pin 225a and a second tab 227b and second mounting pin 225b. These tabs are attached in a spaced manner along substantially the entire length of each of the fluting sections for securely attaching the fluting sections to a stalk roll. Finally, each of the mounting tabs is preferably attached to an aft portion of the fluting, i.e., in a direction opposite to that in which the ears of corn are displaced by the fluting, to minimize contact between the ears of corn and the mounting tab and coupling pin combinations and reduce wear on the mounting tabs and coupling pins resulting from this contact.

Referring to FIGS. 16 and 17, there are respectively shown front plan and side elevation views of a pick-up cone, or rotating transport vane, 270 and a mounting arrangement therefore in accordance with another embodiment of the present invention. Pick-up cone 270 includes fluting 270a on its outer peripheral surface and a pointed, forward end portion 270b. Pick-up cone 270 is adapted for secure mounting to a structural support member 278 disposed in a forward portion of a corn head (not shown). Pick-up cone 270 is oriented such that its pointed, forward end portion 270b is oriented in the direction of travel of the combine as shown by direction arrow 276.

Pick-up cone 270 is rotated by means of a drive shaft 274 extending through an elongated aperture 278a in structural support member 278 and an aligned elongated mounting slot 285 within an aft section 272c of an adjustable skid plate 272. Pick-up cone 270 is protected during operation from impact damage caused by rocks or heavy debris within a field traversed by the combine by means of the adjustable skid plate 272. Skid plate 272 includes a forward section 272a, a lower section 272b and the aforementioned aft section 272c. The skid plate's aft section 272c includes three elongated slots 284, 285 and 286. Mounting bolts 280a and 280b attached to structural support member 278 are inserted through respective elongated slots 284 and 286. These two elongated slots in combination with elongated aperture 285 through which the rotating drive shaft 274 extends allow for vertical adjustment of skid plate 272 as shown by the dotted lines in a lower portion of FIG. 17. By varying the vertical position of adjustable skid plate 272, the spacing between the skid plate and pick-up cone 270 may be adjusted for optimum residue clearing performance and protection of the rotating pick-up cone depending upon conditions in the field in which the combine is operating.

The forward section 272a of adjustable skid plate 272 is also provided with an elongated slot 288 adapted to receive the distal end of the rotating drive shaft 274. The distal end of rotating drive shaft 274 is securely attached to the skid plate's forward section 272a by means of a bearing coupler 290 which is coupled to the end of drive shaft 274 and provides a bearing surface to facilitate rotation of the drive shaft while engaging the forward section 272a of the adjustable skid plate 272 to securely attach the drive shaft to the skid plate.

Figure 18:
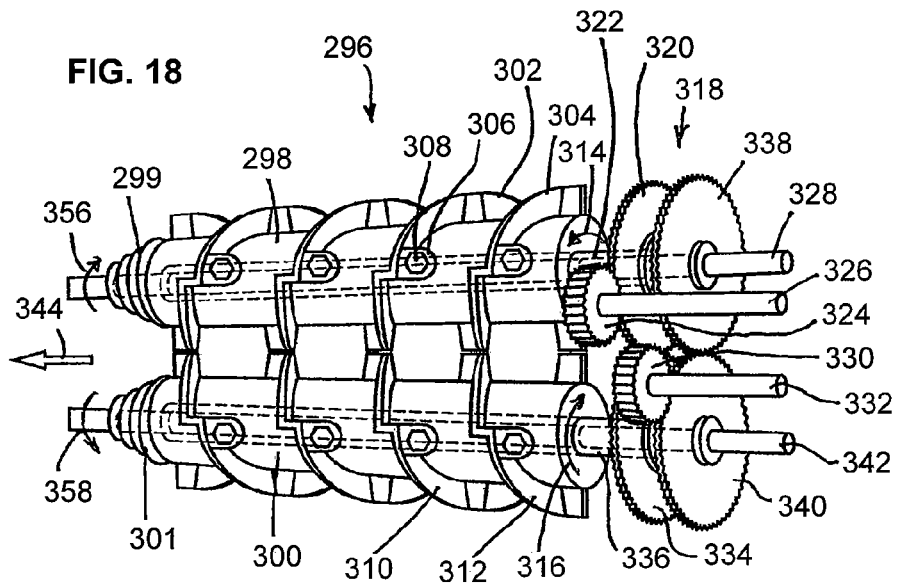
FIG. 18 is an upper perspective view of additional details of a stalk roll arrangement in accordance with the present invention.

Referring to FIG. 18, there is shown an upper perspective view of another embodiment of a stalk roll arrangement 296 in accordance with the principles of the present invention. Stalk roll arrangement 296 includes first and second stalk rolls 298 and 300 disposed in a closely spaced manner and arranged in parallel alignment and adapted for rotational displacement by means of a drive assembly 318. As in the previously described embodiment, the first stalk roll 298 includes first and second spiral fluting 302 and 304 disposed about its outer periphery and extending substantially the entire length of the stalk roll. Similarly, the second stalk roll 300 includes third and fourth spiral fluting 310 and 312 disposed about its outer periphery and extending substantially its entire length. Disposed adjacent a forward end of the first stalk roll 298 is a first plant residue pick-up cone 299, while disposed adjacent a forward end of the second stalk roll 300 is a second plant residue pick-up cone 301. As in the previously described embodiment, each of the aforementioned fluting sections is attached to a respective stalk roll by means of the combination of a mounting tab 306 and coupling pin, such as a bolt or screw, 308 such as shown on the first stalk roll 298. The direction of travel of stalk arrangement 296, which is typically attached to the forward portion of a combine, during operation in a field is shown by direction arrow 344.

The first and second stalk rolls 298, 300 and the first and second pick-up cones 299, 301 are rotationally displaced by means of drive assembly 318 in the following manner. The first pick-up cone 299 is coupled to a first inner drive shaft 328, while the first stalk roll 298 is coupled to a first outer drive shaft 322. The first inner drive shaft 328 is coaxially disposed within and extends along the length of the first outer drive shaft 322. Similarly, the second pick-up cone 301 is coupled to a second inner drive shaft 342, while the second stalk roll 300 is coupled to a second outer drive shaft 336. The second inner drive shaft 342 is coaxially disposed within and extends along the length of the second outer drive shaft 336. A first drive gear 320 is coupled to an aft end of the first outer drive shaft 322, while a second drive gear 334 is coupled to an aft end of the second outer drive shaft 336. Engaging the first and second drive gears 320, 334 is a first input drive gear 324 for rotationally displacing each of the first and second drive gears and each of the first and second outer drive shafts 322, 336. The first input drive gear 324 is coupled to a first input drive shaft 326 which, in turn, is coupled to a source of rotary displacement, such as a hydraulic motor, which is conventional in design and operation and is not shown in the figure for simplicity. Rotation of the first input drive gear 324 will result in rotation of both the first and second drive gears 320, 334, but in opposite directions. Thus, rotation of the first input drive gear 324 in a direction so as to rotationally displace the first stalk roll 298 in the direction of arrow 314 will result in an opposite rotation of the second stalk roll 300 in the direction of arrow 316. Thus, the first and second stalk rolls 298, 300 rotate so as to direct plant residue to the space located between and above the two stalk rolls permitting the stalk rolls to reduce plant residue and discharge it between the two stalk rolls to the ground.

A second input drive gear 330 coupled by means of a second input drive shaft 332 to a source of rotary power (not shown) engages the third and fourth drive gears 338, 340. Rotational displacement of the third and fourth drive gears 338, 340 results in corresponding rotation of the first and second inner drive shafts 328 and 342. As in the case of the first and second drive gears 320, 334, rotation of the second input drive gear 330 results in opposite rotation of the first and second inner drive shafts 328 and 342. This gives rise to rotation of the first and second pick-up cones 299, 301 in opposite directions as shown by direction arrows 356 and 358 in FIG. 18. It is in this manner that the first and second stalk rolls 298, 300 may be simultaneously rotated in opposite directions, with the first and second pick-up cones 299, 301 also simultaneously rotated in opposite directions, with each pick-up cone also rotated in a direction opposite to that of its associated stalk roll.

Figure 19:
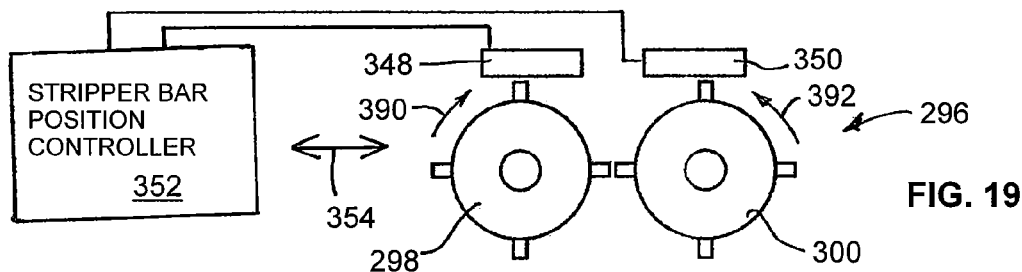
FIG. 19 is a simplified schematic illustration of a pair of stalk rolls and a pair of upper stripper bars and a controller for controlling the position of the stripper bars relative to the two stalk rolls.

Referring to FIG. 19, there is a shown a simplified schematic diagram of the stalk roll arrangement of FIG. 18 including the first and second stalk rolls 298 and 300. Also shown in FIG. 19 are first and second upper stripper bars 348 and 350 disposed immediately above the first and second stalk rolls 298, 300, respectively. Each of the first and second upper stripper bars 348, 350 is mounted in the combine head in a movable manner which permits the two upper stripper bars to be displaced in the directions of arrow 354. Thus, the first and second upper stripper bars 348, 350 may be moved toward each other or away from each other as dictated by harvesting conditions. Each of the first and second upper stripper bars 340, 350 is coupled to a stripper bar position controller 352 which allows for either moving the two upper stripper bars closer together or further apart as dictated by harvesting conditions. Stripper bar position controller 352 may be conventional in design and operation and may be in the form of a mechanically operated system, a hydraulic powered system or an electric powered system. The system controller may be manually actuated or computer controlled.

Figure 20:
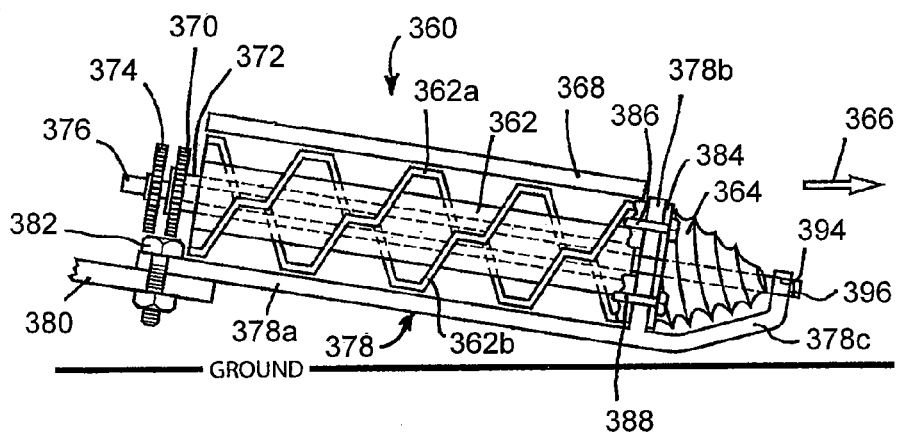
FIG. 20 is a side elevation view shown partially in phantom of another embodiment of a stalk roll and lower weed stripper bar in accordance with the present invention.

Referring to FIG. 20, there is shown a side elevation view partially in phantom of a stalk roll arrangement 360 in accordance with another embodiment of the present invention. Stalk roll arrangement 360 is intended for installation in a combine head, where the combine during operation moves in the direction of arrow 366. Stalk roll arrangement 360 includes a pair of side-by-side stalk rolls arranged in parallel such as shown in FIG. 18, where only a single stalk roll 362 is shown in FIG. 20 for simplicity. As in the previously described embodiments, stalk roll 362 includes first and second spiral fluting 362a and 362b disposed about its outer periphery and extending substantially the entire length of the stalk roll. Disposed adjacent a forward end of stalk roll 362 is a plant pick-up cone 364, also as previously described. Stalk roll 362 is coupled to the combination of a first drive gear 370 and a first outer drive shaft 372 for imparting rotational displacement to the stalk roll. Similarly, pick-up cone 364 is coupled to the combination of a second drive gear 374 and a second inner drive shaft 376 for imparting rotational displacement to the pick-up cone. Disposed immediately above and aligned generally parallel with stalk roll 362 is an upper stripper bar 368. A similar arrangement would be provided for a second stalk roll disposed in a closely spaced, lateral position relative to stalk roll 362 as in the previously described embodiments.

Stalk roll 362 is attached to the combine head by means of a weed stripper bar/skid plate combination 378. An aft end portion of the stripper bar/skid plate 378 is mounted to a combine head structural member 380 by means of mounting members 382, which in the embodiment shown in FIG. 20 is a nut and bolt combination. Stripper bar/skid plate 378 extends forwardly in the direction of travel of arrow 366 from the combine head. Stripper bar/skid plate 378 includes an elongated, linear stripper bar portion 378a which is adapted to remove weeds from the rotating stalk roll 362 and allow the weeds to drop to the ground. Stripper bar/skid plate 378 further includes a forward skid plate portion 378c closely spaced in relation to the rotating pick-up cone 364. Stripper bar/skid plate 378 provides support for the leading end of pick-up cone 364 and protects the pick-up cone from impact damage arising from contact with obstructions in the field such as rocks, debris and roots. Stripper bar/skid plate 378 further includes an upwardly extending mounting plate 378b which allows for attachment of a forward portion of stalk roll 362 and an aft portion of pick-up cone 364 to the stripper bar/skid plate by means of the combination of a coupling plate 384 and first and second mounting bolts 386 and 388. Although not shown in FIGS. 18, 19 and 20, or in the earlier described figures, the auger stripper arrangements described herein would preferably be used in combination with slip clutches coupled to the stalk rolls and perhaps to the pick-up cones for removing the rotational drive input to these various components in the event an obstruction in a field, such as a rock, becomes wedged against one of the aforementioned rotating components to prevent damage to or breakage of a component of the auger stripper arrangements disclosed herein.

Referring to FIG. 21, there is shown a top plan view of a combination of a first row divider 400 attached to a front portion of a first row unit 404 and a second row divider 402 attached to a front end portion of a second row unit 406. Disposed between the first and second row units 404, 406 is an inter-row unit space 410 through which ears of corn are directed rearwardly for deposit in the combine's cross auger 408, as previously described.

In accordance with this embodiment of the invention, first and second ear of corn retainers 412 and 414 are attached to respective upper, forward portions of the first and second row units 404, 406. Each of the first and second ear retainers 412, 414 is designed to substantially span the inter-row unit space 410 adjacent respective forward portions of the first and second row units 404, 406 to prevent ears of corn from being deflective forwardly toward the first and second row dividers 400, 402. The first and second ear retainers 412, 414 thus prevent ears of corn from escaping the inter-row unit space 410 and ensure that the ears of corn are directed rearwardly as previously described for deposit in the combine's cross auger 408. The first ear retainer 412 is attached to an upper portion of the first row unit 404 by means of a combination of a first mounting plate 416 and a first mounting bolt 420. Similarly, the second ear retainer 414 is attached to an upper portion of the second row divider 406 by means of a combination of a second mounting plate 418 and second mounting bolt 422. FIG. 22 is a front plan view of the first and second ear retainers 412, 414 as positioned in closely spaced relation on upper portions of the first and second row units 404, 406. The first ear retainer 412 is provided with a first aperture 412a, while the second ear retainer 414 is provided with a second aperture 414a, where each of the apertures is adapted to receive a respective mounting bolt for attaching the ear retainers to respective upper portions of the first and second row units. The first and second ear retainers 412, 414 are preferably comprised of a flexible, resilient material such as of rubber or plastic, while the first and second mounting plates 414, 416 are preferably comprised of metal for attaching the ear retainers to the plastic housing of the row units.

Figure 23:
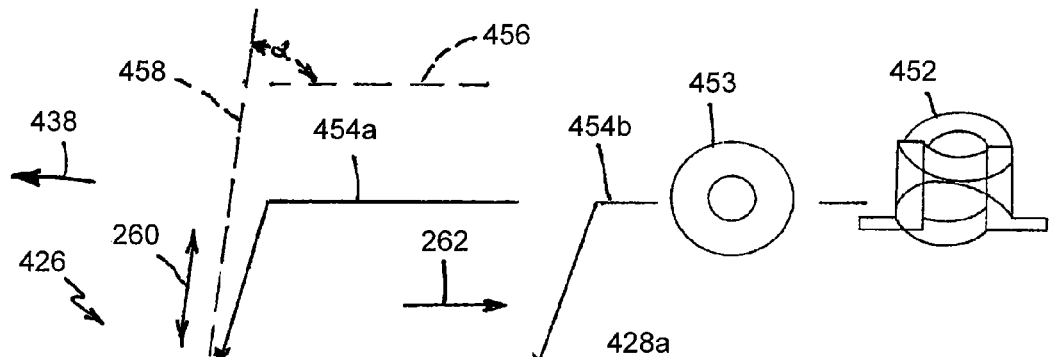
FIG. 23 is a sectional view of a transport mechanism for directing ears of corn toward a cross auger of a combine in accordance with another embodiment of the present invention.

Referring to FIG. 23, there is shown a sectional view of a transport mechanism 426 for directing ears of corn in the direction of arrow 262 toward the cross auger 434 of a combine in accordance with another embodiment of the present invention. Cross auger 434 rotates in the direction of arrow 436 for displacing ears of corn within the combine for the removal of the kernels of corn from the cob portion as in a conventional combine.

Transport mechanism 426 includes a pair of side-by-side stripper bars with only one of the stripper bars, stripper bar 428 shown in FIG. 23 for simplicity. Stripper bar 428 has an irregular upper surface shown as including plural spaced, inclined notches 428a on its upper surface. Stripper bar 428 is positioned upon and supported by a compressible, resilient mounting support 430 in accordance with this embodiment of the present invention. A spacer 464 is disposed between and in contact with stripper bar 428 and the upper surface of the compressible, resilient mounting support 430. Spacer 464 provides support for stripper bar 428 and protects the upper surface of the mounting support 430 from excessive wear. Mounting support 430 is comprised of a compressible, resilient material such as rubber or polyurethane which is capable of being compressed in a vertical direction by a force applied to its upper surface, and resuming its initial size and shape following removal of the applied force. The combination of stripper bar 428 and mounting support 430 is mounted to a row unit structural number 432 by means of first and second mounting bolts 440 and 442. First and second mounting bolts 440, 442 are inserted through aligned, vertically offset apertures within stripper bar 428, mounting support 430, and row unit structural member 432. First and second mounting bolts 440, 442 are coupled at their respective lower ends to the row unit structural number 432 by means of the combination of a first nut 444 and a first tapered bushing, or washer, 448 and a second nut 446 and a second tapered busing 450. First and second mounting bolts 440, 442 are provided with respective lower threaded portions 440a and 442a. First and second nuts 444 and 446 are adapted for secure attachment to the respective lower threaded end portions 440a and 442a of the first and second mounting bolts 440, 442. The upper end of each of the first and second mounting bolts 440, 442 is adapted for secure engagement with the combination of a washer 453 and a press fit coupler 452. While only one washer 453 and press fit coupler 452 is shown in FIG. 23 for simplicity, the upper end of each of the mounting bolts 440, 442 is adapted to receive a respective combination of a washer and press fit coupler as shown by arrows 454 and 454b in the figure. Each of the press fit couplers 452 is preferably comprised of metal or a high strength plastic and securely attaches the upper end of a respective mounting bolt to stripper bar 428.

The action of a pair of spaced rotating spiral stalk rollers disposed below a pair of closely spaced stripper bars causes the corn plants to be intermittently pulled down between the pair of spaced stripper bars, where one of these stripper bars is shown as stripper bar 428 shown in FIG. 23. Thus, the severed corn stalks are pulled down between stripper bar 428 and another matched stripper bar disposed in closely spaced relation to stripper bar 428, with the ears of corn engaged by the closely spaced stripper bars so as to separate the ears of corn from the remaining portion of the corn stalk. This intermittent downward pulling action on the corn stalks and the stripper bars causes the stripper bars, such as stripper bar 428 shown in FIG. 23, to be intermittently displaced downwardly in the downward direction of bi-directional arrow 260. The compressible nature of mounting support 430 allows for the downward displacement of stripper bar 428. Mounting support 430 is also resilient and upon removal of the intermittent downward force applied to the stripper bar as the corn stalks are pulled below the stripper bars, the resiliency of mounting support results in an upward displacement of stripper bar 428 (and its associated closely spaced stripper bar) in the upward direction of bi-directional arrow 260 so as to resume its initial position within the corn head.

As shown in FIG. 23, the first and second mounting bolt 440 and 442 are oriented at an angle α relative to the plane of stripper bar 428. With dotted line 456 representing the plane of the stripper bars, and with dotted line 458 representing the axial orientation of the first and second mounting bolts 440, 442, it can be seen that an acute angle α is formed between the plane of the stripper bar and the axial alignment of the first and second mounting bolts 440, 442. The reciprocating motion of stripper bar 428 in the directions of bi-directional arrow 260 causes the plural spaced, inclined notches 428a on the upper surface of the stripper bar to displace the ears of corn in the direction of arrows 262 toward the combine's cross auger 434 for removing the kernels of corn from the cob portion of the plant. This repetitive up and down and forward-back motion of the stripper bars allows the stripper bars to function as a conveyor for the rearward displacement of the ears of corn toward the combine's cross auger 434.

The first and second mounting bolts 440, 442 are inserted through respective vertically offset, aligned apertures within the stripper bar 428 and row unit structural number 432. The first and second tapered bushings 448 and 450 respectively disposed about the first and second mounting bolts 440, 442 maintain the vertically offset orientation of each of the mounting bolts which ensures that during a downward displacement of the stripper bar 428, the stripper bar moves downwardly and leftwardly as shown in FIG. 23. When the downward intermittent force is removed from stripper bar 428, mounting support 430 is allowed to expand to its original shape and size and the stripper bar and the ears of corn disposed on its upper surface are moved upwardly and rightwardly toward cross auger 434 as shown in FIG. 23. The spaced, inclined notches 428a in the upper surface of stripper bar 428 ensure the rightward displacement of the ears of corn toward the combine's cross auger 434.

Figure 24:
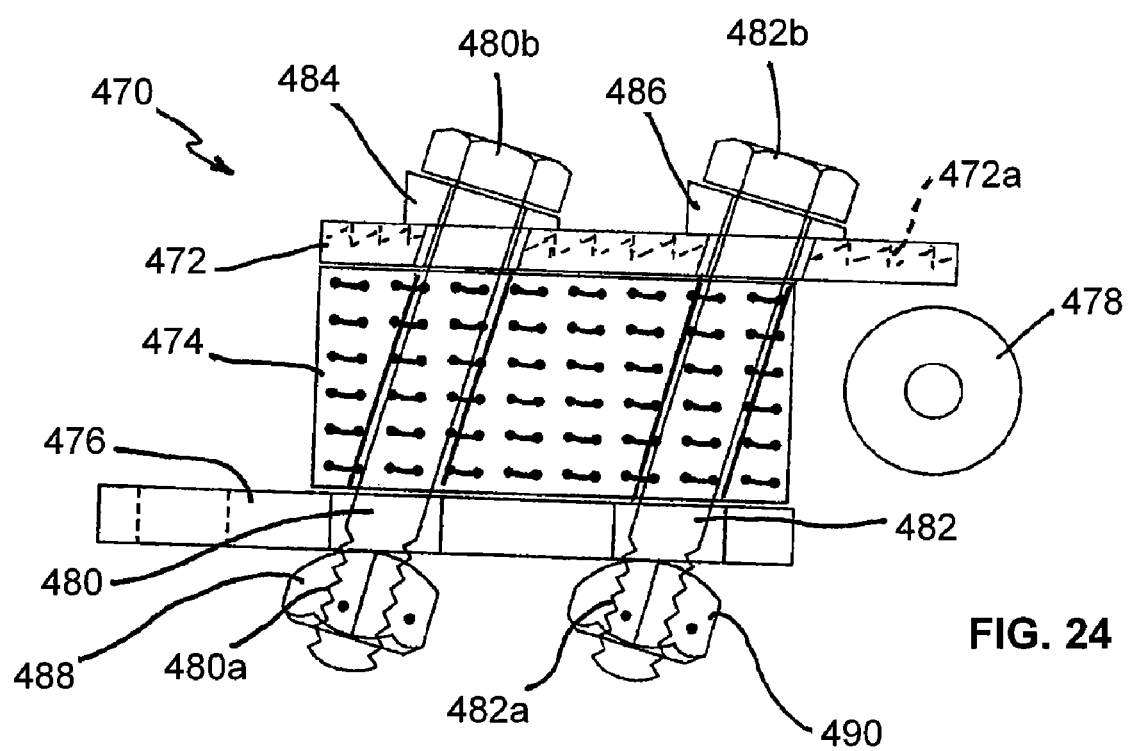
FIG. 24 is a sectional view of yet another embodiment of a transport mechanism for moving ears of corn toward the combine's cross auger in accordance with the present invention.

Referring to FIG. 24, there is shown another embodiment of a transport mechanism 470 for moving ears of corn rightwardly toward the combine's cross auger 478 in accordance with the present invention. In the embodiment shown in FIG. 24, first and second mounting bolts 480, 482 are inserted through vertically offset, aligned apertures within an upper stripper bar 472 and a lower row unit structural number 476. Each of the first and second mounting bolts 480, 482 is further inserted through spaced apertures within a compressible, resilient mounting support 474 disposed between the upper stripper plate 472 and the lower row unit structural number 476. The apertures within upper stripper plate 472, mounting support 474 and lower row unit structural member 476 are aligned with one another in a vertically offset manner so that each of the mounting bolts are disposed in an inclined orientation relative to vertical. The upper surface of stripper bar 472 is irregular in nature and may include plural spaced, inclined notches 472a as shown in dotted line form in FIG. 24. The notched portion 472a of stripper bar 472 extends only over an inner portion of the stripper bar in facing relation to a second stripper bar which is not shown in FIG. 24, but is described above as well in the following description.

Each of the first and second mounting bolts 480, 482 has a respective threaded lower end portion 480a and 482a. Attached to the lower end threaded end portions 480a, 482a of the first and second mounting bolts 480, 482 are first and second lock nuts 488 and 490. Each of the lock nuts 488, 490 is attached to the respective lower threaded ends of the first and second mounting bolts 480, 482 in a locked manner, and includes a respective upper curved, or convex, surface which engages a lower surface of the row unit structural number 476. Each upper end of the first and second mounting bolts 480, 482 includes a respective bolt head 480b, 482b. Disposed between and engaging the upper surface of stripper bar 472 and first bolt head 480b and second bolt head 482b are first and second tapered bushings 484, 486 respectively. Each of the first and second tapered bushings 484, 486 is preferably comprised of a high strength, durable plastic for reducing wear on the stripper plate 472 as well as on the first and second mounting bolts 480, 482. The tapered configuration of the first and second bushings 484, 486 as well as the vertically offset alignment of the bolt receiving apertures in the upper stripper plate 472, mounting support 474 and lower row unit structural number 476 maintain the mounting bolts 480, 482 in vertically offset, parallel alignment as shown in FIG. 24. Downward displacement of stripper bar 472 as described above results in compression of the compressible, resilient mounting support 474, as well as leftward displacement of the stripper bar because of the vertically offset alignment of the mounting bolts 480, 482. Upon removal of the downward force with the displacement of the plant residue between the adjacent stripper bars, the compressible, resilient mounting support 474 urges stripper bar 472 in an upward, rightward direction. This upward, rightward displacement of stripper bar 472 causes its notched upper portion 472a to displace ears of corn disposed on the stripper bar in a rightward direction toward the combine's cross auger 478 for deposit of ears of corn onto the cross auger. The upper curved portions of the first and second lock nuts 488, 490 allow for limited rotational displacement of the first and second mounting bolts 480, 482 during the downward and upward displacement of stripper bar 472 and reduce wear on the lower surface of the row unit structural member 476. Rocker washers may also be used in place of the curvilinear lock nuts.

Figure 25:
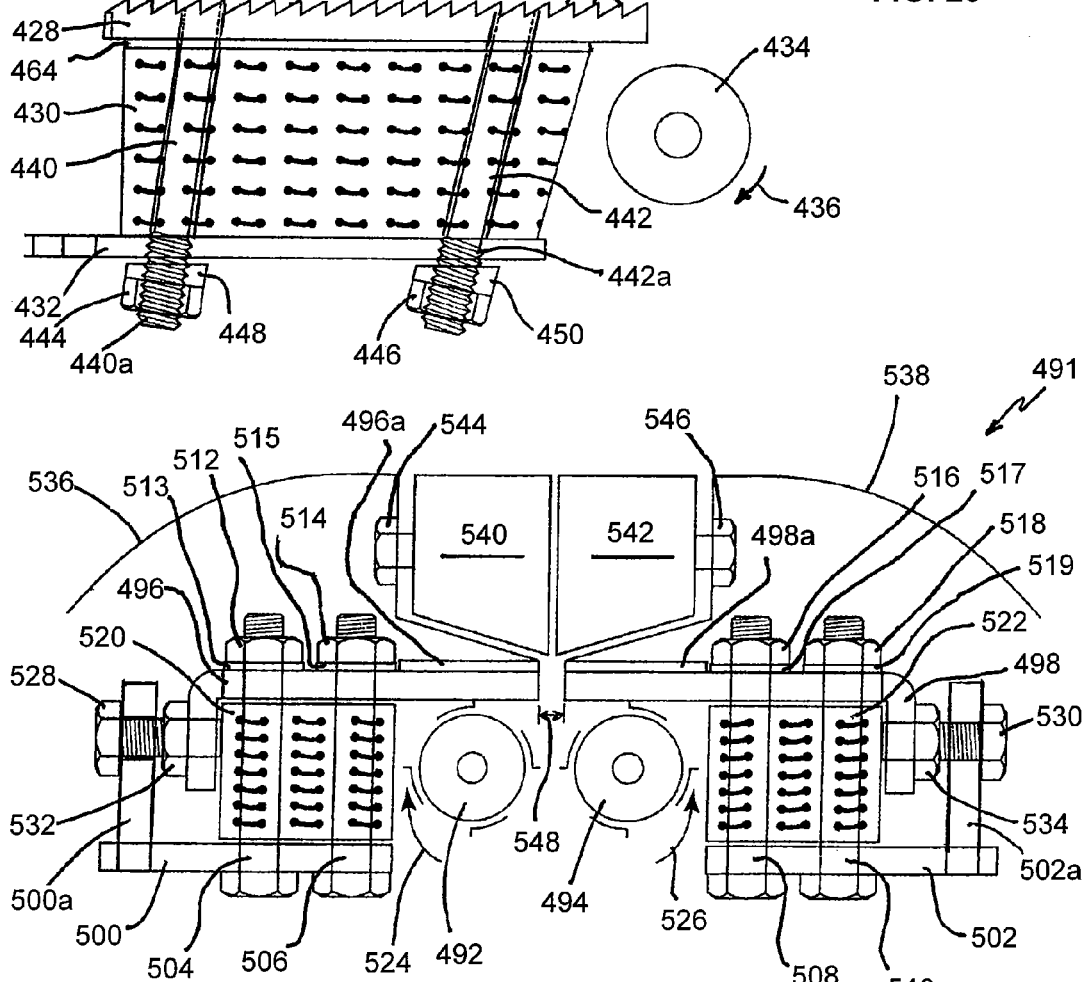
FIG. 25 is a front plan view shown partially in section of a stalk roll arrangement incorporating a pair of compressible, resilient mounting supports in accordance with another embodiment of the present invention.

Referring to FIG. 25, there is shown a front plan view shown partially in section of a stalk roll arrangement 491 incorporating a pair of compressible, resilient mounting supports 520 and 522 in accordance with this embodiment of the present invention. The stalk roll arrangement 491 is disposed within a row divider housing which is attached to a forward portion of a combine (now shown) and which includes a first portion of the row divider housing 536 and a second portion of the row divider housing 538. Only the upper portion of the row divider housing is shown in FIG. 25 for simplicity. The stalk roll arrangement 491 further includes first and second spiral stalk rollers 492 and 494 respectively rotating in the directions of arrows 524 and 526. The stalk roll arrangement 491 further includes first and second stripper bars 496 and 498 as well as first and second row unit structural members 500 and 502 in accordance with this embodiment of the present invention. First stripper bar 496 is mounted to a first row unit structural member 500 by means of first and second mounting bolts 504 and 506. Similarly, second stripper bar 498 is mounted to a second row unit structural member 502 by means of third and fourth mounting bolts 508 and 510. Securely coupled to each of the first through fourth mounting bolts 504, 506, 508 and 510 are respective nuts 512, 514, 516 and 518. Disposed between each of the aforementioned nuts 512, 514, 516 and 518 and the first or second stripper bars 496 498 is a respective tapered bushing 513, 515, 517 and 519. Each of the four tapered bushings 513, 515, 517 and 519 is similar in configuration and function to tapered bushings 484 and 486 described above in terms of FIG. 24. Disposed on an upper, inner surface of the first stripper bar 496 is a notched portion 496a, while disposed on an upper, inner portion of the second stripper bar 498 is a similar upper notched portion 498a. Each of the upper notched portions 496a and 498a is similar in configuration and function to the notched portions of the stripper bars described above in terms of FIGS. 23 and 24. Disposed between the first stripper bar 496 and the first row unit structural member 500 is a first compressible, resilient mounting support 520, while disposed between the second stripper bar 498 and the second row unit structural member 502 is a second compressible, resilient mounting support 522. Each of the first and second compressible, resilient mounting supports 520, 522 is similar in configuration and function to the compressible, resilient mounting supports illustrated in FIGS. 23 and 24 and described in detail above.

Threadably attached to an outer portion of the first stripper bar 496 is a first positioning bolt 528. Similarly, threadably attached to an outer portion of the second stripper bar 498 is a second positioning bolt 530. The first and second positioning bolts 528 and 530 threadably engage fixed upward extensions 500a and 502a of the first and second row unit structural members 500 and 502. The threaded end portion of the first positioning bolt 528 is coupled to the first stripper bar 496 as well as to the first compressible, resilient mounting support 520. Similarly, the threaded end portion of the second positioning bolt 530 is coupled to the second stripper bar 498 as well as to the second compressible, resilient mounting support 522. Rotation of the first and second positioning bolts 528, 530 in a first direction causes inward displacement of the first and second stripper bars 496, 498 as well as the first and second compressible, resilient mounting supports 520, 522 toward the first and second spiral stalk rollers 492 and 494. Similarly, rotation of the first and second positioning bolts 528, 530 in a second, opposed direction results in displacement of first and second stripper bars 496, 498 as well as the first and second compressible, resilient mounting supports 520, 522 in a direction away from the first and second spiral stalk rollers 494 and 496. In this manner, the first and second stripper bars 496, 498 as well as the first and second compressible, resilient mounting supports 520, 522 may be moved toward one another or away from one another to change the gap, or spacing, 548 between the first and second stripper bars depending upon crop harvesting conditions.

Attached to inner surfaces of the adjacent first and second portions of the row divider housing 536, 538 by means of respective mounting bolts 544 and 546 are first and second ear of corn retainers 540 and 542. Ear retainers 540, 542 prevent ears of corn stripped from the corn stalks from falling forward from the space between and above inner portions of the first and second stripper bars 496, 498 back onto the field. First and second ear retainers 540, 542 are similar in configuration and function to the ear retainers illustrated in FIGS. 21 and 22 and described in detail above.

While particular embodiments of the present invention have been illustrated and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matters set forth in the foregoing description and accompanying drawings is offered by way of illustration only and not as a limitation. The actual scope of the invention is intended to be defined in the following claims when viewed in their proper perspective based on the prior art.

I claim:

1. A row unit for use in a corn head attached to a combine, said row unit comprising:

first and second cylindrical rotating stalk rolls laterally disposed in closely spaced relation to one another, wherein each stalk roll has an input end for receiving corn stalks and an opposed output end and said stalk rolls rotate in opposite directions, and wherein each stalk roll includes outer spiral fluting extending outwardly from and along at least a portion of the length of said stalk roll, wherein said outer fluting includes first portions extending generally parallel to a longitudinal rotational axis of said stalk roll and second portions extending at an angle to said axis, wherein said second portions of said fluting are oriented at an inclined angle relative to the longitudinal axis of its associated stalk roll and said first and second portions are arranged in an alternating manner in the fluting, and wherein said first and second portions of the fluting are generally flat and curvilinear, respectively, and wherein the generally flat first portions of the fluting each include a respective sharpened distal edge portion to facilitate reduction of the plant residue to small pieces, and wherein said outer fluting is in the form of a thin, sheet-like material extending generally radially from a lateral outer surface of a stalk roll, wherein rotation of said stalk rolls positions harvested corn plants above and intermediate said first and second stalk rolls;

a stripper arrangement disposed above said first and second stalk rolls for receiving corn plants and separating ears of corn from plant residue;

wherein the first portions of said fluting reduce and displace the crop residue to a space between said stalk rolls for discharge from the combine and the second portions of said outer fluting direct ears of corn from the input end to the output end of the stalk rolls and to the combine;

first and second corn plant pick-up cones respectively disposed adjacent the inlet ends of said first and second stalk rolls, wherein each of said first and second pick-up cones includes respective spiral outer fluting disposed on the pick-up cone's outer surface; and a drive mechanism coupled to said first and second stalk rolls and to said first and second pick-up cones for rotationally displacing said stalk rolls and pick-up cones, wherein said drive mechanism includes plural gears and first and second coaxial drive shafts respectively coupling said first stalk roll and said first pick-up cone to said gears and third and fourth coaxial drive shafts respectively coupling said second stalk roll and said second pick-up cone to said gears for rotating said first stalk roll and said first pick-up cone in opposite directions and said second stalk roll and said second pick-up cone in opposite directions.

2. The row unit of claim 1, wherein each of said stalk rolls includes plural outer spiral fluting disposed in a spaced manner about a lateral, outer surface of said stalk roll.

3. The row unit of claim 2, wherein each of said stalk rolls includes first and second outer fluting disposed on opposed portions of the lateral outer surface of the stalk roll.

4. The row unit of claim 2, wherein each of said stalk rolls includes respective first and second outer fluting, where said first and second outer fluting are disposed approximately 180° from each other about the lateral outer surface of the stalk roll.

5. The row unit of claim 1, wherein said first and second portions of said fluting are disposed in an alternating manner on the lateral outer surface of the stalk roll.

6. The row unit of claim 1, wherein said thin, sheet-like material is comprised of a hard, high-strength metal.

7. The row unit of claim 1, wherein said thin, sheet-like material is comprised of a hard, high-strength plastic.

8. The row unit of claim 1, wherein the first and second portions of said first and second flutings are in mutual alignment about the outer peripheral portions of said first and second stalk rolls.

9. The row unit of claim 1 wherein the outer fluting of said first and second pick-up cones are arranged in opposite directions.

10. The row unit of claim 1 further comprising first and second skid plates respectively disposed in closely spaced relation to said first and second pick-up cones for protecting said pick-up cones from impact damage and preventing clogging of the pick-up cones and their associated stalk rolls by vegetation.

11. The row unit of claim 10, wherein each skid plate is disposed adjacent a lower, forward portion of a respective one of said pick-up cones.

12. The row unit of claim 11, wherein each pick-up cone includes a respective forwardly directed, pointed portion, and wherein each skid plate is further disposed adjacent the pointed forward portion of its associated pick-up cone.

13. The row unit of claim 10 further comprising a mounting mechanism for positioning each of said skid plates adjacent a respective one of said pick-up cones in an adjustable manner to allow for changing the spacing between a skid plate and a respective one of said pick-up cones.

14. The row unit of claim 1 further comprising a drive arrangement including a first gear and first drive shaft combination coupled to said first stalk roll and a second gear and second drive shaft combination coupled to said second stalk roll for rotationally displacing said stalk rolls.

15. A row unit for use in a corn head attached to a combine, said row unit comprising:

first and second cylindrical rotating stalk rolls laterally disposed in closely spaced relation to one another, wherein each stalk roll has an intake end for receiving corn stalks and an opposed outlet end and said stalk rolls rotate in opposite directions, and wherein each stalk roll includes plural spaced fluting members disposed about the outer circumference and extending at least a portion of the length of each stalk roll, and wherein said fluting members are configured and oriented to displace ears of corn from the stalk roll's intake end toward its outlet end and to the combine, and wherein each fluting member extends outwardly from its associated stalk roll and includes first portions extending generally parallel to a longitudinal axis of said stalk roll and second portions oriented at an inclined angle relative to a longitudinal axis of its associated stalk roll and said first and second portions are arranged in an alternating manner in the fluting, and wherein said first and second portions of the fluting are generally straight and curvilinear, respectively, and said generally straight first portions of the fluting include sharpened distal edge portions to facilitate reduction of the plant residue to small pieces and said fluting is in the form of a thin, sheet-like material extending generally radially outwardly from a lateral outer surface of a stalk roll, wherein rotation of said stalk rolls positions harvested corn plants below and intermediate said first and second stalk rolls;

first and second corn plant pick-up cones respectively disposed adjacent to the inlet ends of said first and second stalk rolls;

a drive mechanism coupled to said first and second stalk rolls and to said first and second pick-up cones for rotationally displacing said stalk rolls and pick-up cones, wherein said drive mechanism includes plural gears and first and second coaxial drive shafts respectively coupling said first stalk roll and said first pick-up cone to said gears and third and fourth coaxial drive shafts respectively coupling said second stalk roll and said second pick-up cone to said gears for rotating said first stalk roll and said first pick-up cone in opposite directions and said second stalk roll and said second pick-up cone in opposite directions; and first and second fixed stripper plates respectively disposed in closely spaced relation to lower portions of said first and second stalk rolls for removing ingested vegetation from and preventing clogging of said stalk rolls.

16. The row unit of claim 15, wherein each knife end portion of a fluting member is formed by a generally flat portion of the fluting member.

17. The row unit of claim 15, wherein said plural spaced fluting members are each configured in a spiral pattern about the outer circumference of each of said first and second stalk rolls.

18. The row unit of claim 15, wherein each of said fluting members is curved in shape and is comprised of a single piece of high strength metal.

19. The row unit of claim 15, further comprising third and fourth stripper plates respectively disposed above and in closely spaced relation to said first and second stalk rolls for separating ears of corn from plant residue.

20. The row unit of claim 15, wherein said first and second stripper plates include respective skid bar portions disposed below and adjacent said first and second pick-up cones for protecting said pick-up cones from impact damage from obstructions in a field.

* * * * *